(12) United States Patent
Kouno et al.

(10) Patent No.: US 7,770,620 B2
(45) Date of Patent: Aug. 10, 2010

(54) REINFORCED AIR BLADDER FOR SAFETY TIRE

(75) Inventors: Yoshihide Kouno, Kunitachi (JP); Kazumasa Hagiwara, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 713 days.

(21) Appl. No.: 11/628,332

(22) PCT Filed: Jun. 1, 2005

(86) PCT No.: PCT/JP2005/010070
§ 371 (c)(1), (2), (4) Date: Dec. 19, 2006

(87) PCT Pub. No.: WO2005/118316
PCT Pub. Date: Dec. 15, 2005

(65) Prior Publication Data
US 2008/0023117 A1  Jan. 31, 2008

(30) Foreign Application Priority Data
Jun. 2, 2004 (JP) .............................. 2004-164574
Jun. 2, 2004 (JP) .............................. 2004-164658

(51) Int. Cl.
*B60C 5/02* (2006.01)
*B60C 5/04* (2006.01)
*B60C 5/08* (2006.01)
*B29D 30/00* (2006.01)

(52) U.S. Cl. ........................ 152/450; 152/510; 152/511; 152/512; 428/34.1

(58) Field of Classification Search ................ 428/34.1, 428/450, 510, 511; 152/512
See application file for complete search history.

(56) References Cited

U.S. PATENT DOCUMENTS 5,871,602 A * 2/1999 Paonessa et al. ............ 152/517
6,467,518 B1 * 10/2002 Clouet et al. ............. 152/340.1
7,165,587 B2 * 1/2007 Tsukagoshi et al. ......... 152/512

(Continued)

FOREIGN PATENT DOCUMENTS

JP        10-324110      * 12/1998

(Continued)

OTHER PUBLICATIONS

Machine translation of JP 10-324110, Dec. 1998.*

*Primary Examiner*—Justin Fischer
(74) *Attorney, Agent, or Firm*—Sughrue Mion, PLLC

(57) ABSTRACT

The present invention provides a reinforced lightweight air bladder for a safety tire which can effectively suppress a radial growth under the normal running condition even if it is used for a long tire and, on the other hand, to suppress an occurrence of a crack in a tube under the runflat running condition, thereby exhibiting a superior durability.

A hollow toric reinforced air bladder 1 is to be accommodated in a tire 2 to form a safety tire. The reinforced air bladder 1 is filled with the air at an internal pressure determined in relation to a given air pressure of the tire 2 to form a cavity $S_1$ in tire 2. When the internal pressure of the cavity $S_1$ of the tire 2 is dropped due to getting punctured or the like, the reinforced air bladder 2 is radially expanded to take over load support from the tire 2. The reinforced air bladder 1 comprises an air-impermeable tube 6 and a reinforcing hoop layer 7 surrounding entirely an outer circumference of a crown portion of the tube 6. The reinforcing hoop layer 7 is made of a low tension resistance material.

23 Claims, 15 Drawing Sheets

U.S. PATENT DOCUMENTS

| | | |
|---|---|---|
| 2003/0178116 A1 | 9/2003 | Yamaguchi et al. |
| 2004/0177909 A1 | 9/2004 | Tsukagoshi et al. |

FOREIGN PATENT DOCUMENTS

| | | | |
|---|---|---|---|
| JP | 2001-10314 A | | 1/2001 |
| JP | 2002-120526 | * | 4/2002 |
| JP | 2002-192923 | * | 7/2002 |
| JP | 2004-90807 A | | 3/2004 |
| WO | WO 02/43975 A1 | | 6/2002 |
| WO | WO 02/096678 A1 | | 12/2002 |

* cited by examiner

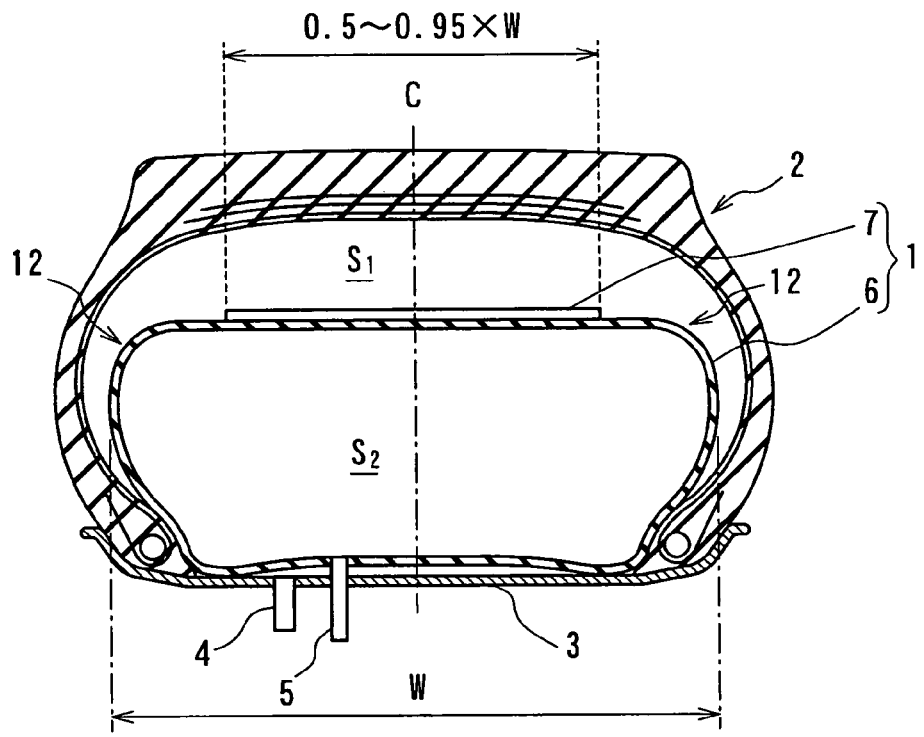
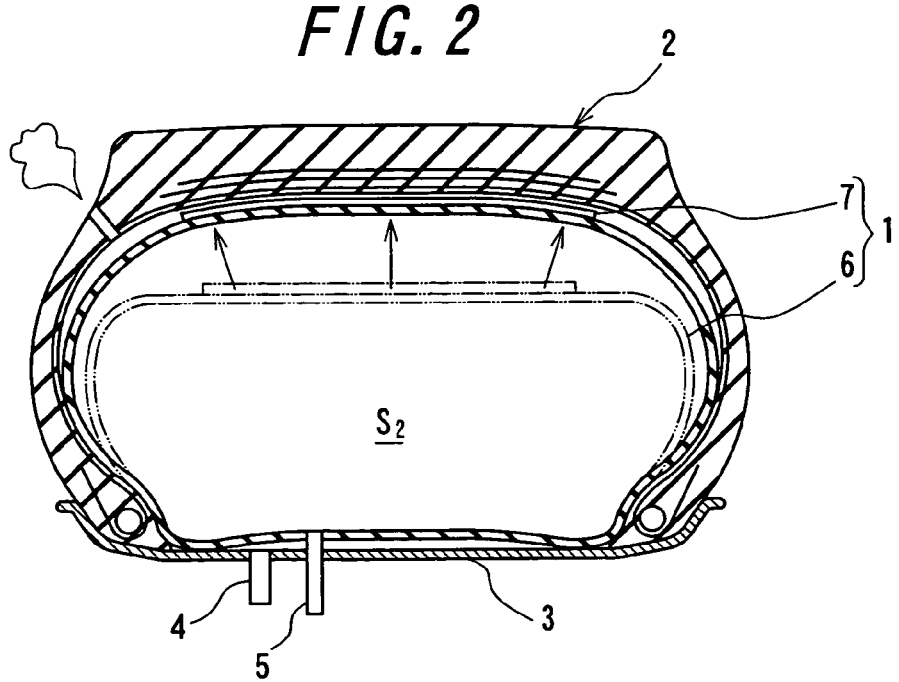

REINFORCED AIR BLADDER FOR SAFETY TIRE

TECHNICAL FIELD

The present invention relates to a hollow toric reinforced air bladder which is to be accommodated in a tire and filled with the air at an internal pressure determined in relation to a given air pressure of the tire to form a cavity at least between an inner surface of the tire and the bladder under the normal internal pressure state of the tire and to radially expand with a decrease in the internal pressure of the tire to take over load support from the tire. Particularly, the present invention directs to lighten the weight and improve the durability of such an air bladder.

RELATED ART

As a safety tire which can travel for a certain distance even in the runflat state where the tire internal pressure is suddenly lowered due to puncture or the like, known are tires in which a tire load is taken over by a reinforcing member such as a reinforcing tube, reinforcing rubber and reinforcing belt, a foaming body, elastic body, or a core, or a tire in which a sealant is applied or filled to block a damaged portion such as a hole generated on the tire to prevent the internal pressure from dropping. However, in these conventional safety tires, manufacturing methods are complicated and handling in attachment is difficult in many cases.

In order to solve the above problems, JP 2001-10314 A, for example, describes a tube-like air bladder which is accommodated inside the safety tire and takes over a load support from the tire by inflating and deforming with a decrease of the tire internal pressure in the runflat state where the tire internal pressure is lowered. In such an air bladder, however, the air bladder is radially outwardly grown due to an influence of a centrifugal force associated with a rotation of the tire under a load, so that the outer surface of the air bladder may touch and rub against the inner circumferential surface of a tread portion and eventually the air bladder may be destroyed.

WO 02/43975 describes that the radial growth of the tube under the normal running condition is suppressed by a reinforcing layer constituting at least a crown portion of the tube and the reinforcing layer is assigned a physical property exhibiting an elongation rate-tensile force characteristic in which an elongation due to the expansive deformation substantially increases as the tensile force gradually increases, whereby the air bladder under the runflat running condition can uniformly touch the tire. However, when such a reinforcing layer is formed integrally with a tube by vulcanized joint, a foreign object such as a small metal piece invading through, for example, a puncture hole of the tire may be intervened between the reinforced air bladder and the tire and may penetrate, collide or rub the reinforcing layer to cause a crack in the reinforcing layer. In this case, the crack may promptly propagate to the tube integrally formed with the reinforcing layer and, as a result, there arises a problem that the durability of the air bladder is decreased.

WO 02/96678 describes that a reinforcing layer is applied over the entire outer circumference on a crown portion of a tube constituting an air bladder and the reinforcing layer is formed separately from or bonded with a small peel strength to the tube, so that the above-mentioned crack in the reinforcing layer is prevented from propagating to the tube.

DISCLOSURE OF THE INVENTION

The air bladders disclosed in WO 02/43975 and WO 02/96678, however, apply a composite body of non-woven fabric and rubber to form the reinforcing layer, so that when the air bladder is used for a long time, a rubber portion constituting the air bladder suffers a creep deformation to radially expand due to the influence of a centrifugal force associated with the rotation of the tire or the pressure of air filled in the air bladder. Eventually, the air bladder may reach to and rub against the internal surface of the tire and thus the reinforcing layer is concerned to be destroyed. In order to suppress the radial growth due to the creep deformation, the reinforcing member has to consist of a plurality of the composite body, which results in an increased weight of the safety tire and therefore is unfavorable.

It is, therefore, an object of the present invention to provide a reinforced lightweight air bladder for a safety tire in which the reinforcing layer is optimized to be able to effectively suppress a radial growth under the normal running condition even if it is used for a long time and, on the other hand, to suppress an occurrence of a crack in a tube under the runflat running condition, thereby exhibiting a superior durability.

To achieve the above-mentioned object, the present invention is a hollow toric reinforced air bladder which is to be accommodated in a tire and filled with the air at an internal pressure determined in relation to a given air pressure of the tire to form a cavity at least between an inner surface of the tire and the bladder under the normal internal pressure state of the tire and to radially expand with a decrease in the internal pressure of the tire to take over load support from the tire, said reinforced air bladder comprising an air-impermeable tube and a reinforcing hoop layer surrounding entirely an outer circumference of a crown portion of the tube, wherein the reinforcing hoop layer is made of a low tension resistance material.

As used herein, the term "given air pressure" refers to the air pressure specified for a safety tire, in which the reinforced air bladder is to be accommodated, in an industrial specification, standard or the like such as JATMA, TRA and ETRTO which are effective in the area where the tire is manufactured, sold or used depending on the load capacity. The term "internal pressure determined in relation to a given air pressure" refers to such an internal pressure that a cavity can be formed between the outer surface of the reinforcing air bladder and the inner surface of the tire under the air-charged state that the given air pressure is applied to the tire, and that the reinforced air bladder can be radially expanded with a decrease in the internal pressure of the tire to take over load support from the tire under a runflat state that the internal pressure of the tire has been lost. More specifically, the term refers to the internal pressure greater than the given air pressure by preferably up to 20% of the given air pressure. The term "low tension resistance material" refers to a material having such a creep characteristic that can prevent the reinforce air bladder from a remarkable radial expansion until it reaches the end of its usable life under the normal running condition of the safety tire in which the reinforced air bladder is accommodated.

The low tension resistance material has a creep deformation rate preferably of not more than 5% under a condition where a tension which is the same magnitude of a tension acting on a tube filled with the internal pressure corresponding to 5% of the given air pressure of the tire is applied. As used herein, the term "tension acting on a tube filled with the internal pressure" refers to a tension per unit width acting on the tube before it being radially expanded by the applied internal pressure, and more specifically it refers to force $f=rP$, where r is an initial radius of the tube and P is an applied pressure. The term "creep deformation rate" refers to an elongation rate of a test piece of its length at the elapsed time of 100 hours to its length at the elapsed time of 10 hours while allowing it at the testing temperature of 80 deg.C with applying a given tensile, and is measured according to the tensile creep test specified in Japanese Industrial Standard (JIS) K 7115-1993.

The low tension resistance material has an elongation rate preferably of not less than 20% under a condition where a tension which is the same magnitude of a tension acting on a tube filled with the internal pressure identical to the given air pressure is applied.

Preferably, either the yield strength and the breaking strength of the low tension resistance material is larger than the tension acting on the tube filled with the internal air pressure corresponding to 5% of the given tire pressure, and is smaller than the tension acting on the tube filled with the given air pressure of the tire. As used herein, "yield strength" and "breaking strength" refer to results obtained according to JIS K 7161.

In addition, the low tension resistance material is preferably a resin or a composite material of cords and rubber. As the low tension resistance material, polypropylene, polycarbonate, and polyethylene terephthalate may be recited by way of example. As the cords constituting the composite material, organic fiber cord such as 6-nylon, 66-nylon, aramid, polyethylene terephthalate, polyethylene naphthalate and the like, which are used in a belt layer of a conventional tire may be recited by way of example.

Further, from the view point of downsizing a manufacturing equipment, the reinforcing hoop layer preferably consists of at least two ring members. In this case, it is preferred that the ring member is formed by circumferentially winding a ribbon member with making an overlapping portion extending over at least one lap and the ribbon member is bonded to itself at least one part of the overlapping portion.

Alternatively, from the view point of improving a production efficiency, the reinforcing hoop layer is preferably formed by spirally winding the ribbon member.

Moreover, the air bladder may have two or more reinforcing hoop layers. In this case, the reinforcing hoop layers preferably consist of at least two ring members arranged side by side and a member formed by radially winding a ribbon member.

Furthermore, the reinforcing hoop layer is preferably laid within a region of 50-95% of the tube width with the central plane in the width direction being as its center on the tube filled with an internal pressure of 5% of the given air pressure of the tire.

It is also preferred that the reinforcing hoop layer is formed separately from the tube, or bonded to the tube with peel strength of not more than 4 kN/m. As used herein, the term "peel strength" refers to a result obtained according to the peeling test of fabric and vulcanized rubber specified in JIS K 6256 at the testing temperature of 80 deg.C.

Preferably, the reinforced air bladder further comprises a protection layer having a wider width than that of the reinforcing hoop layer on the outer circumference of the crown portion of the tube, and the protection layer is made of a high elongation material and formed separately from the tube. As used herein, the term "wider width" means that it is not less than 50% of the width of the reinforcing hoop layer.

Alternatively, the reinforced hoop layer may further comprise a protection layer having a wider width than that of the reinforcing hoop layer, and the protection layer may be made of a high elongation material and bonded to the tube with peel strength of not more than 4 kN/m.

From the view point of downsizing a manufacturing equipment, the protection layer preferably consists of at least two ring member, and from the view point of equalizing the applied tension between the ring member and retaining an uniform shape in both of normal running and runflat running, the protection layer is preferably formed by spirally winding a ribbon member. The protection layer may be arranged only on the crown portion of the tube, but the protection layer preferably extends to both sides of the tube and more preferably surrounds entirely the tube over the entire lap.

Further, the tube is preferably provided on the crown portion with a strengthening layer having non-woven fabric, short fiber or organic fiber cords aligned in the same direction.

Furthermore, the outer circumference of the tube is preferably provided with means for preventing a displacement to prevent the reinforcing hoop layer from moving in the width direction.

It is also preferred that the means for preventing a displacement are clipping projections which are arranged on two circumferential lines each passing through an outer circumferential point of the tube contacting each of the edges of the reinforcing hoop layer, at least two through projections which are arranged on two circumferential line each passing through outer circumferential points of the tube near the edges of the reinforcing hoop layer and which radially extend through the reinforcing hoop layer, both of the clipping projections and the through projections, or side walls of a recessed portion shaped on the crown portion of the tube to be able to receive the reinforcing hoop layer. As used herein, the term "near the edges of the reinforcing hoop layer" refers to regions within 2% of the width of the reinforcing hoop layer extending inwardly from the edges of the reinforcing hoop layer in the width direction of the reinforced air bladder.

The above-mentioned clipping projection preferably has a ridge shape extending in the radial direction of the tube, or a hook shape with its tip portion bending and extending inwardly in the width direction of the reinforced air bladder.

BRIEF DESCRIPTION OF THE DRAWINGS

FIG. 1 is a widthwise sectional view of a safety tire accommodating a typical reinforced air bladder according to the present invention showing in a state where the safety tire is equipped on a rim and filled with a given internal pressure.

FIG. 2 is a widthwise sectional view of the safety tire shown in FIG. 1 immediately after the safety tire gets punctured.

BEST MODE FOR CARRYING OUT THE INVENTION

Figure 3A:
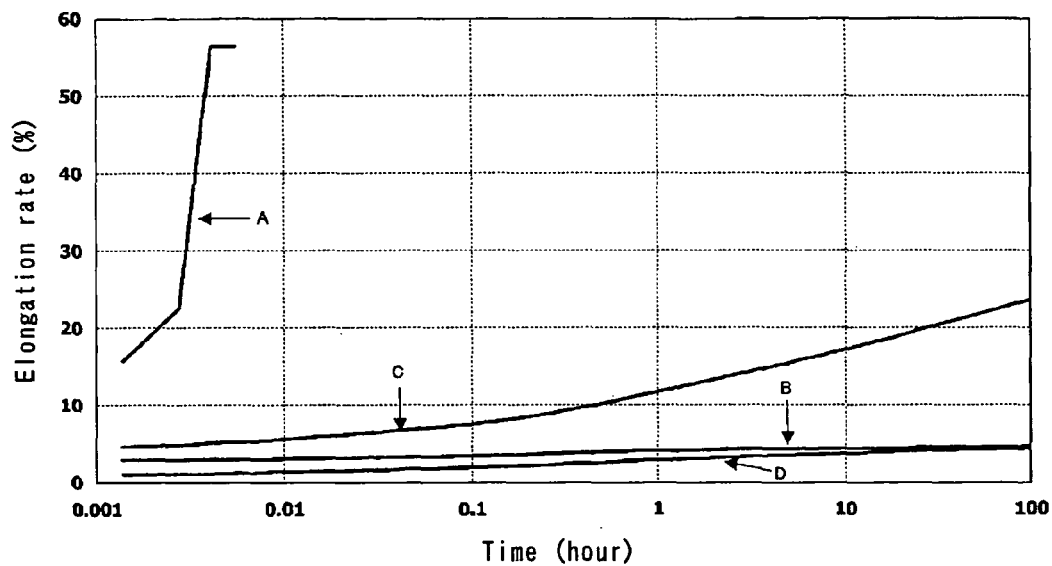
FIG. 3a is a graph showing temporal changes in elongation rates of various materials.
Figure 3B:
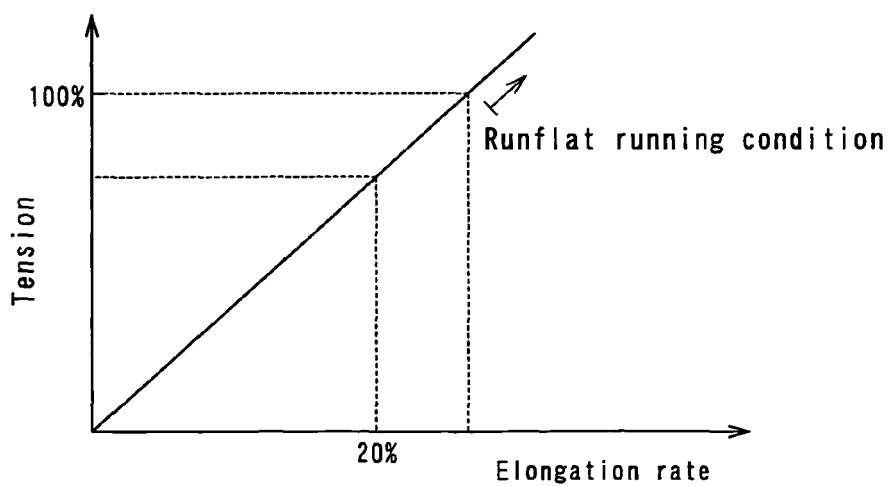
FIG. 3b is a graph showing a tension-elongation rate characteristic of a typical low tension resistance material constituting a reinforcing hoop layer used in the present invention.

With reference to the drawings, embodiments of the present invention will be discussed below. FIG. 1 is a widthwise sectional view of a safety tire accommodating a typical reinforced air bladder according to the present invention showing in a state where the safety tire is equipped on a rim and filled with a given internal pressure, and FIG. 2 is a widthwise sectional view of the safety tire shown in FIG. 1 immediately after the safety tire gets punctured.

A reinforced air bladder 1 has a hollow toric shape and is accommodated in a tire 2 to form a safety tire. A tire assembly is formed when the safety tire is mounted on a rim 3. A given air pressure is charged into the tire 2 via a air-charging valve 4, and air is charged into the reinforced air bladder 1 via a air-charging valve 5 at an internal pressure determined in relation to the given pressure of the tire 2. As a result, as shown in FIG. 1, cavities $S_1$ and $S_2$ are formed in the tire 2 and the reinforced air bladder 1, respectively. When the internal pressure in the cavity $S_1$ of the tire 2 is rapidly dropped due to, for example, getting punctured, the difference in the internal pressure between the cavities $S_1$ and $S_2$ becomes larger so that the reinforced air bladder 1 is radially expanded and eventually reaches to the inner surface of the tire 2, as shown in FIG. 2. In this state, the reinforced air bladder 1 takes over load support from the tire 2.

A main structural feature of the present invention is that the reinforced air bladder 1 has an air-impermeable tube 6 and a reinforcing hoop layer 7 surrounding entirely an outer circumference of a crown portion of the tube and the reinforcing hoop layer 7 is made of a low tension resistance material.

In the next, it will be discussed, along with its operation, how the above-mentioned constitution has been adopted to the present invention.

In a safety tire utilizing a conventional reinforced air bladder, the internal pressure of the reinforced air bladder is set to be slightly higher than the internal pressure of the tire, so that when the internal pressure of the tire is dropped due to, for example, getting punctured, the reinforced air bladder can be smoothly expanded in the radial direction. Accordingly, the differential pressure between the internal pressure of the reinforced air bladder and the internal pressure of the safety tire is always applied to the reinforced air bladder under the normal running condition. In addition, when the safety tire is rotated under load, a centrifugal force acts on the reinforced air bladder, especially on the crown portion. Since a tension produced by the combination of the differential pressure and the centrifugal force is typically smaller than the yield strength, it has been thought that the reinforced air bladder can maintain its shape. It is, however, noticed that if such a safety tire is used over a long period, the reinforced air bladder rubs against the inner surface of the tire to be destroyed.

The present inventors have repeatedly studied the cause of this and found the following facts; the reinforcing hoop layer of the conventional reinforced air bladder is typically constructed from a plurality of composite body made of rubber and non-woven fabric; while the reinforcing hoop layer effectively retains the shape of the reinforced air bladder at the early stage in use, the above-mentioned tension continuously acts on the reinforcing hoop layer to cause a creep deformation; the reinforced air bladder is then radially expanded and eventually reaches to the inner surface of the tire; and, as a result, the reinforced air bladder rubs against the inner surface of the tire to be destroyed. It is also found that since the tire generates heat during a rotation under load and the rubber has a tendency to cause larger creep deformation as the temperature arises, the radial expansion is further facilitated.

In order to prevent such creep deformation, it is generally considered that the creep strength is increased by thickening the reinforcing hoop layer, but thickening the reinforcing hoop layer involves increased weight of the safety tire, which is unfavorable. In addition, the desired effect on the prevention of the creep deformation may not be obtained. This is because the weight is increased due to the thickened reinforced hoop layer and thus the centrifugal force applied to it is also increased, so that the improvement of the rigidity is offset. Moreover, in order to prevent the increase of the weight, it may be considered that a reinforcing layer made only of non-woven fabric is winded around the tube, but sufficient strength cannot be obtained and the shape of the reinforced air bladder is difficult to be maintained when the coating rubber is not penetrated into the non-woven fabric, because the rigidity of the non-woven fabric is derived only from intertwined short fibers.

Therefore, the present inventors has reached a technical idea that instead of using rubber which is prone to cause a creep deformation, a low tension resistance material, which is hardly elongated even when a low tension is applied over a long period, is used as the reinforcing hoop layer, and thus the shape of the reinforced air bladder under the normal running condition can be well maintained up to the end of the usable life, which prevents the reinforced air bladder from rubbing against the internal surface of the tire due to its radial growth under the normal running condition; as a result, the durability of the reinforced air bladder can be improved.

FIG. 3a shows temporal changes in elongation rates of test pieces measured according to JIS K 7115-1993 at the testing temperature of 80 deg.C while a given tension is applied to the test pieces. In this figure, the line A is a graphical representation where non-oriented polyethylene with the thickness of 1 mm is used as a material not having a low tension resistance characteristic. The line B is a graphical representation where a composite body made of rubber and non-woven fabric is used, as can be seen in the conventional reinforcing hoop layer, but five composite bodies made of rubber and non-woven fabric are laminated to prevent the creep deformation. The line C is a graphical representation where oriented polypropylene (OPP) with the thickness of 1 mm is used as a low tension resistance material. The line D is a graphical representation where polyethylene terephthalate with the thickness of 0.6 mm is used as a low tension resistance material. As can be seen from the figure, in the case where the material not having a low tension resistance characteristic is used (Line A), the material is largely elongated to cause a radial growth at the early stage of applying the tension, so that the reinforced air bladder may rub against the internal surface of the tire and thus it may be destroyed. In the case where composite bodies of rubber and non-woven fabric are laminated (Line B), the elongation rate measured by the tensile creep test can be suppressed but the creep deformation cannot be effectively prevented. This is because the thickness of the reinforcing hoop layer is as much as 8 mm and, as a result, the weight is remarkably increased, so that the above-mentioned centrifugal force acts on the reinforced air bladder when it is accommodated in the tire. To the contrary, in the cases where low tension resistance materials are used (Lines C and D), the creep deformation can be effectively suppressed.

In this way, when the low tension resistance material is used, the weight of the reinforcing hoop layer is greatly reduced as compared with the conventional one since the coating rubber is no longer necessary, so that the centrifugal force acting on it can be decreased and the reinforced air bladder can be prevented from rubbing against the internal surface of the tire. As a result, the durability of the reinforced air bladder can be further improved. The present invention has been completed based on these findings.

The low tension resistance material constituting the reinforcing hoop layer 7 has a creep deformation rate preferably of not more than 5% under a condition where a tension which is the same magnitude of a tension acting on a tube 6 filled with the internal pressure corresponding to 5% of the given air pressure of the tire is applied. According to the studies accomplished by the present inventors, the deformation of the reinforcing hoop layer is generally in proportion to the common logarithm of the service time except for an initial deformation which causes from the beginning of the use to not more than 10 hours of the service time. Accordingly, considering the usable life of the tire is generally about 100,000 hours, making the elongation rate from 10 hours of the service time to the end stage of the usable life (100,000 hours of the service time) not more than 20%, i.e. making the elongation rate (creep deformation rate) from 10 to 100 hours of the service time not more than 5% may maintain a good shape of the reinforced air bladder after it experiences the initial deformation and therefore may prevent the reinforced air bladder from rubbing against the internal surface of the tire due to the radial growth under the normal running condition. The creep deformation rate from 10 to 100 hours of the service time is more preferably not more than 3%, further preferably not more than 2.5% and most preferably not more than 0.5%.

In the present invention, while the reinforcing hoop layer 7 suppresses the radial growth of the reinforced air bladder under the normal running condition, the reinforcing hoop layer is rapidly deformed or broken upon transforming to the runflat running condition where the internal pressure of the tire is suddenly dropped. Thus, the reinforced air bladder is not hindered its smooth radial expansion. In order to realize these characteristics, the low tension resistance material preferably has such a physical characteristic that the reinforced air bladder can smoothly reach to the inner surface of the tire when a tension which is produced by the internal pressure of the reinforced air bladder under the runflat running condition and acts on the reinforced air bladder, i.e. a tension corresponding to that acting on the tube filled with the given air pressure of the tire is applied.

Figure 3C:
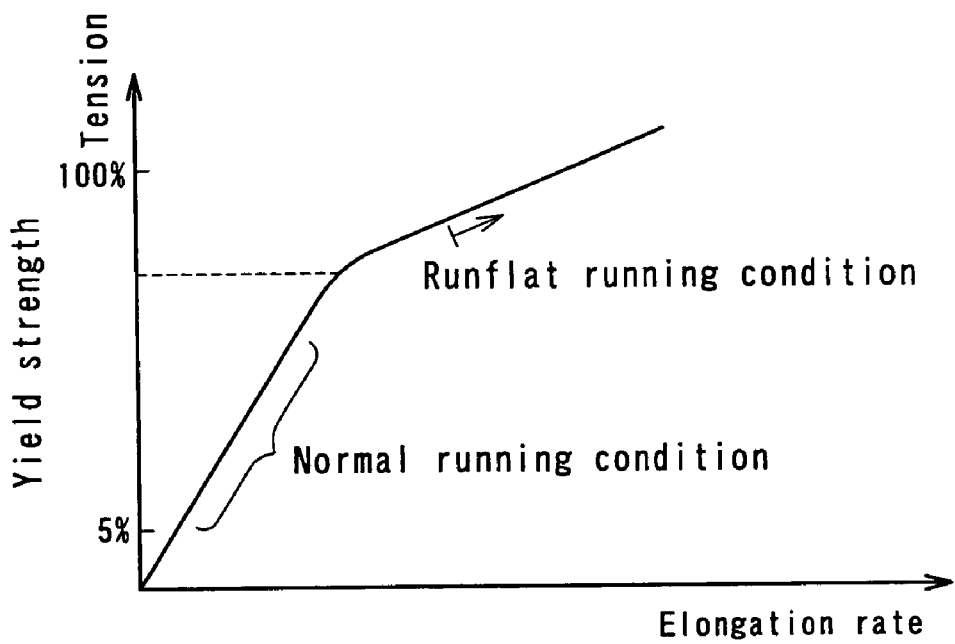
FIG. 3c is a graph showing a tension-elongation rate characteristic of another low tension resistance material constituting a reinforcing hoop layer used in the present invention.
Figure 3D:
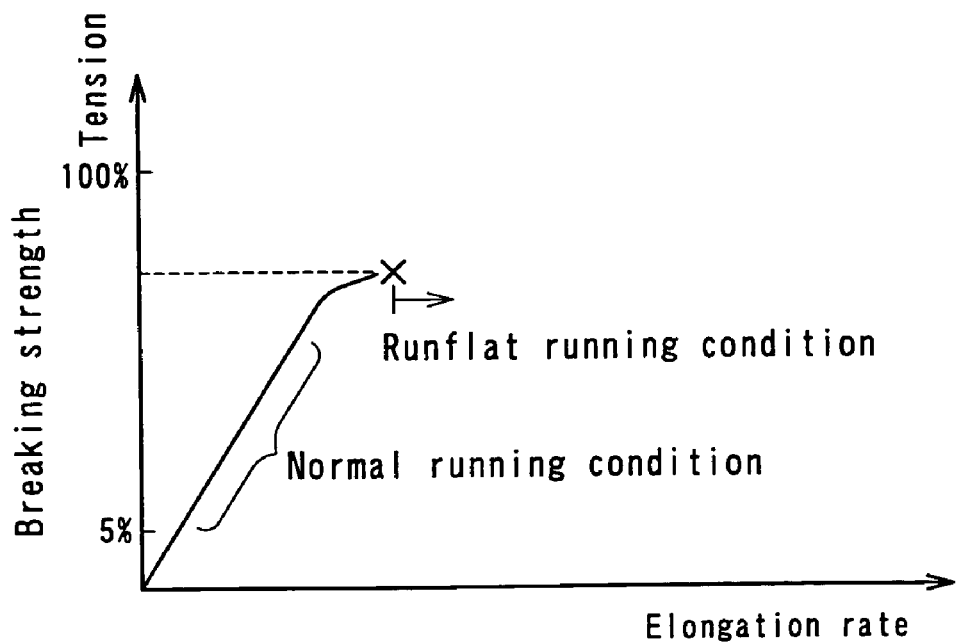
FIG. 3d is a graph showing a tension-elongation rate characteristic of another low tension resistance material constituting a reinforcing hoop layer used in the present invention.

More specifically, for a ordinal safety tire having a reinforced air bladder, the elongation rate of the reinforced air bladder from the normal running condition to the runflat running condition is about 20%. Thus, the low tension resistance material constituting the reinforcing hoop layer 7 has an elongation rate preferably of not less than 20% under a condition where a tension which is the same magnitude of a tension acting on a tube 6 filled with the internal pressure identical to the given air pressure is applied. Alternatively, the yield strength of the low tension resistance material is preferably larger than the tension produced by the difference in pressure between the tire and the reinforced air bladder under the normal running condition and acting on the reinforced air bladder, in particular, as shown in FIG. 3c, the tension acting on the tube filled with the internal air pressure corresponding to 5% of the given tire pressure, and is preferably smaller than the tension produced by the internal pressure of the reinforced air bladder under the runflat running state and acting on the reinforced air bladder, in particular, as shown in FIG. 3c, the tension acting on the tube filled with the given air pressure of the tire. Alternatively, the breaking strength of the low tension resistance material is preferably larger than the tension produced by the difference in pressure between the tire and the reinforced air bladder under the normal running condition and acting on the reinforced air bladder, in particular, as shown in FIG. 3d, the tension acting on the tube filled with the internal air pressure corresponding to 5% of the given tire pressure, and is preferably smaller than the tension produced by the internal pressure of the reinforced air bladder under the runflat running state and acting on the reinforced air bladder, in particular, as shown in FIG. 3d, the tension acting on the tube filled with the given air pressure of the tire.

The low tension resistance material is preferably a resin or a composite material of cords and rubber. The advantages of the material made of a resin are that it is relatively light weight and its creep strength may be relatively easily adjusted by varying the thickness of the material. An example of more preferred resin is those having wider range of the physical properties which can be regulated by processing conditions, quality of material or the like such as polypropylene, polycarbonate, polyethylene terephthalate and nylon. In addition, as the low tension resistance material, polypropylene, polycarbonate, and polyethylene terephthalate may be recited by way of example. On the other hand, the advantage of the composite material is that the reinforcing hoop layer may be built in the same manner of the belt layer in the conventional tire and thus the processing efficiency is high. As the cords constituting the composite material, organic fiber cord such as 6-nylon, 66-nylon, aramid, polyethylene terephthalate, polyethylene naphthalate and the like, which are used in a belt layer of a conventional tire may be recited by way of example. The composite material may be built in the same manner as the belt layer in the conventional tire, i.e. by arranging a plurality of cords in parallel and coating them with rubber. The cords may be arranged along the circumference direction of the air bladder or it may be inclined with respect to the circumference direction of the air bladder.

The reinforcing hoop layer may consist of a single sheet member, as shown in FIG. 1. In other embodiment, from the view point of facilitating the rigidity control, it preferably consists of a plurality of ring members or a ribbon member.

Figure 4:
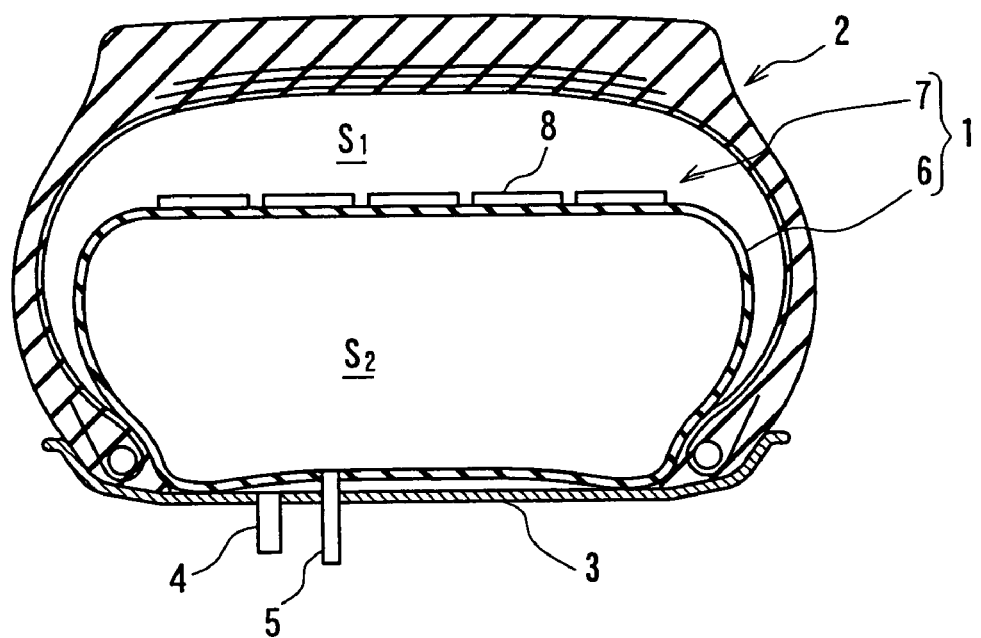
FIG. 4 is a widthwise sectional view of a safety tire accommodating another reinforced air bladder according to the present invention showing in a state where the safety tire is equipped on a rim and filled with a given internal pressure.
Figure 5:
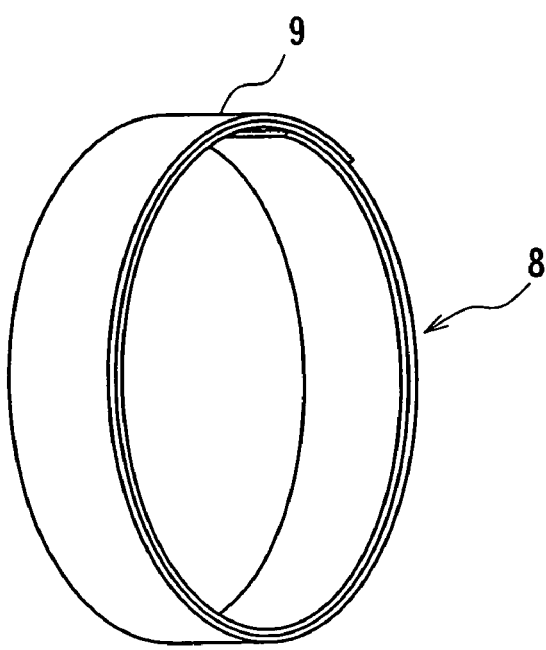
FIG. 5 is a perspective view of a ring member constituting the reinforcing hoop layer shown in FIG. 4.

More specifically, as shown in FIG. 4, the reinforcing hoop layer 7 preferably consists of at least two ring members, e.g. five ring members 8 in the embodiment shown in FIG. 4, arranged in parallel with each other. This makes it possible to build the ring members 8 on one or more arcuate segment, and thus enables to downscale the building equipment. The ring member 8 is preferably formed by circumferentially winding a ribbon member 9 with making an overlapping portion extending over at least one lap and the ribbon member is bonded to itself at least one part of the overlapping portion. In this manner, the ring members 8 are formed from the ribbon member 9 to enable continuous manufacturing of the ring member, so that the production efficiency can be improved. An example of means for the bonding of the ribbon member may be, but not limited to, adhesives and ultrasonic thermal welding.

Figure 6:
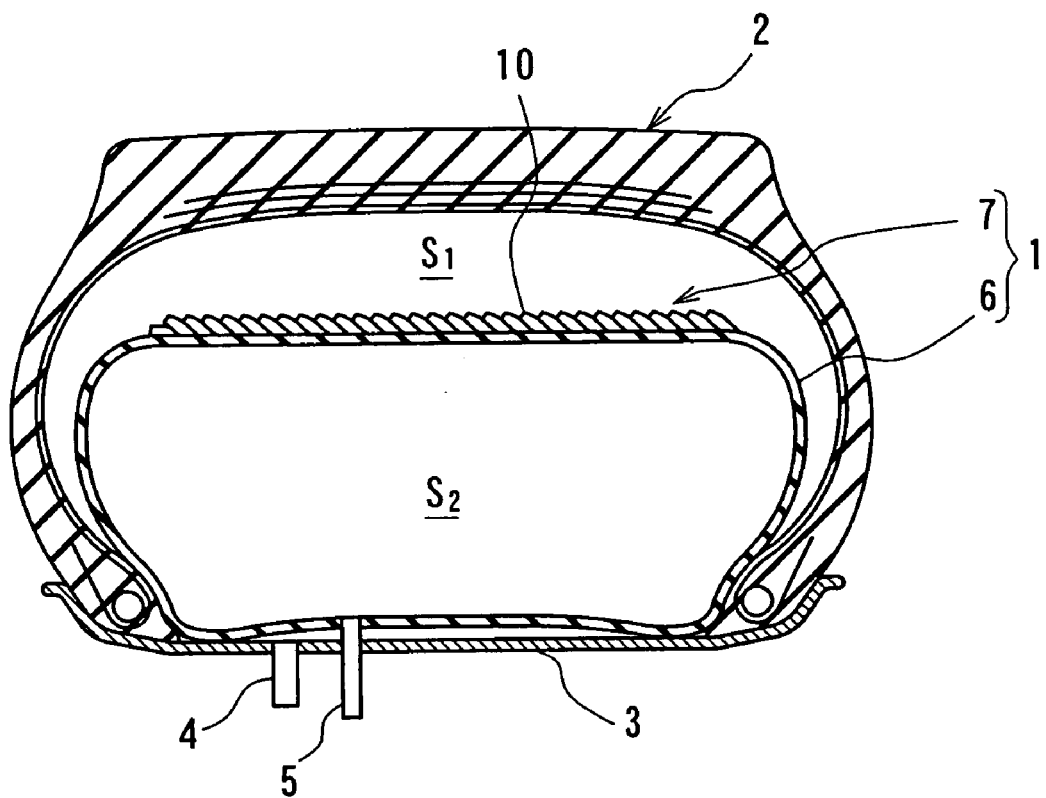
FIG. 6 is a widthwise sectional view of a safety tire accommodating another reinforced air bladder according to the present invention showing in a state where the safety tire is equipped on a rim and filled with a given internal pressure.
Figure 7:
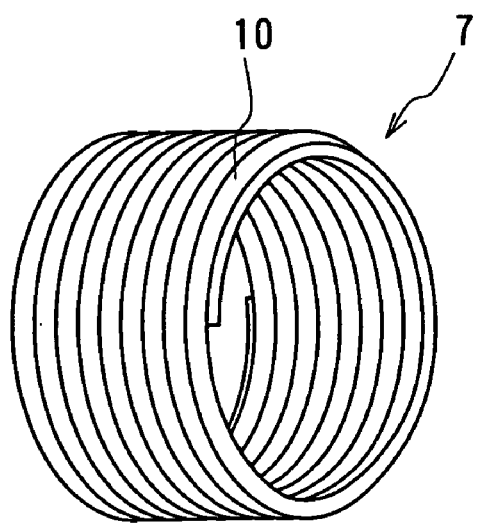
FIG. 7 is a perspective view of ring member constituting the reinforcing hoop layer shown in FIG. 6.

Alternatively, as shown in FIGS. 6 and 7, the reinforcing hoop layer 7 is formed by spirally winding the ribbon member 10. This makes it possible to continuously build the reinforcing hoop layer 7 on an annular rigid supporting body, so that the production efficiency can be improved. One example of the procedure of spirally winding the ribbon member 10 includes the steps of firstly winding the ribbon member 10 on a building drum along the circumferential direction over one lap, bonding a part of the winded ribbon member by means of ultrasonic thermal welding or the like, then winding the ribbon member with making an overlapping portion between the adjacent ribbon members to bond with each other, finally winding the ribbon member along the circumferential direction over one lap, bonding the terminal end by means of ultrasonic thermal welding or the like to, thereby, obtaining a reinforcing hoop layer. In this context, the width of the overlapping portion is preferably not less than 15% of the width of the ribbon member. This is because the bonding force between the ribbon members may be insufficient and thus they could be peeled off if the width of the overlapping portion is less than 15% of the width of the ribbon member.

Figure 8:
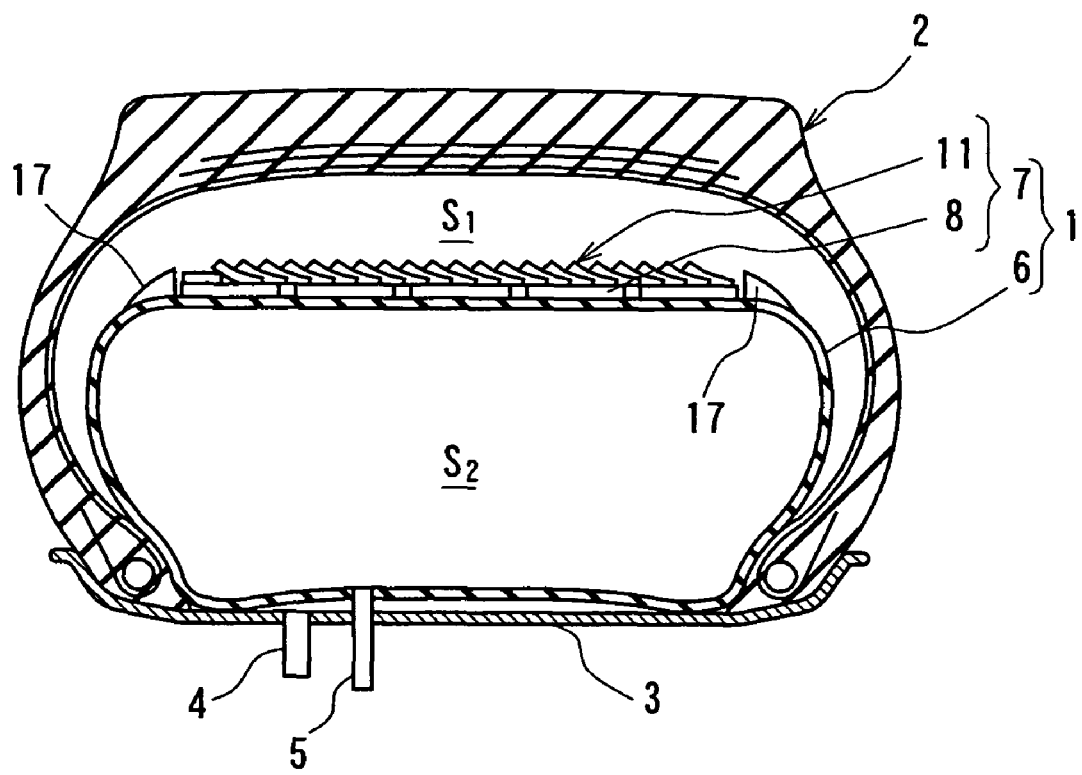
FIG. 8 is a widthwise sectional view of a safety tire accommodating another reinforced air bladder according to the present invention showing in a state where the safety tire is equipped on a rim and filled with a given internal pressure.

The number of the reinforcing hoop layer is not limited to one, and two or more reinforcing hoop layers may be applicable depending on the rigidity required for them. In the latter case, as shown in FIG. 8, the reinforcing hoop layers 7 is preferably consist of at least two ring members, e.g. five ring members 8 in the embodiment shown in FIG. 8, arranged side by side and a member 11 formed by spirally winding the ribbon member 9. This is because each member can exert different functions. For example, the member 11 formed by spirally winding the ribbon member 9 primary contributes to suppress the creep deformation under the normal running condition and the ring member 8 primary contributes to suppress the radial growth under the normal running condition. It is noted that the ring member 8 and the above-mentioned member 11 may be made either from the same material or from the different materials. FIG. 8 shows an example in which the member 11 is arranged on the outer circumference of the ring member 8, but the ring member 8 may be arranged on the outer circumference of the member 11.

Furthermore, as shown in FIG. 1, the reinforcing hoop layer 7 is laid within a region of 50-95% of the width W of the tube 6 with the central plane C in the width direction being as its center on the tube filled with an internal pressure of 5% of the given air pressure of the tire. If the reinforcing hoop layer 7 is laid within a region of less than 50% of the width W of the tube 6 with the central plane C in the width direction being as its center, the effect of the reinforcing hoop layer 7 for suppressing the radial growth of the reinforcing air bladder 1 is insufficient. If it is laid beyond the region of 95%, the reinforcing hoop layer 7 is also arranged on a curved shoulder portion 11 of the tube 6. Since the diameter varies in the shoulder portion 11, it is difficult to arrange the reinforcing hoop layer on the shoulder portion so that a production malfunction may often occur. More preferably, the reinforcing hoop layer 7 is laid within a region of 70%-90% of the width W of the tube 6 with the width central plane C in the width direction being as its center.

Meanwhile, if the tire is driven in a state where a foreign object invaded through a punctured portion into the tire is pinched between the reinforcing hoop layer and the tire under the runflat running condition, the foreign object may penetrate the reinforcing hoop layer in consequence of the ground contact pressure from the road surface and cracks may occur in the reinforcing hoop layer. Then, as the tension is applied to the reinforcing hoop layer in the circumferential direction due to an action of the internal pressure of the tube, the cracks tend to extend in the circumferential direction. In this connection, when the reinforcing hoop layer is strongly bonded to the tube, both of them tend to deform as one unit so that the cracks occurred in the reinforced hoop layer are propagated to the tube and air leakage from the tube may be caused. Such a propagation of the cracks is not a big problem when the reinforcing hoop layer is thick as is the case with the conventional reinforcing air bladder, since the cracks needs time to pass through the reinforcing hoop layer itself and reach to the tube. However, when the thickness of the reinforcing hoop layer is reduced by using a low tension resistance material from the view point of saving the weight, time before the cracks reaches the tube is very short, which may be problematic.

To cope with this problem, the reinforcing hoop layer 7 is formed separately from the tube 6 and tightly attached to the tube by means of an engagement or the like without a vulcanization bonding of the reinforcing hoop layer to the tube with rubber which is commonly used in the conventional reinforced air bladder. As a result, even when cracks occur in the reinforcing hoop layer 7, the reinforcing hoop layer 7 and the tube 6 is separated and thus the cracks cannot reach to the tube 6, so that it is possible to effectively suppress a propagation of the cracks of the reinforcing hoop layer 7 to the tube 6 and improve the durability of the reinforcing air bladder under the runflat running condition. If separately formed reinforcing hoop layer and tube may affect the workability of mounting the reinforcing air bladder to the rim due to the shape of the reinforced air bladder or the like, the reinforcing hoop layer 7 is tightly attached to the tube with a weak adhesion force by glue, double faced adhesive tape or the like. In this reinforce air bladder, even when the cracks occur in the reinforcing hoop layer 7, the reinforcing hoop layer 7 is detached from the tube 6 before the cracks are propagated to the tube 6, so that the cracks of the reinforcing hoop layer 7 to the tube 6 can be effectively suppressed and the durability of the reinforced air bladder under the runflat running condition can be improved.

When the reinforcing hoop layer 7 is tightly attached to the tube 6 with a weak adhesion force, the peel strength is preferably not more than 4 kN/m. This is because the peel strength exceeding this limit may bring a strong bonding between the reinforcing hoop layer 7 and the tube 6 like the vulcanization bonding and they are not separated but deformed as a unit when cracks occur in the reinforcing hoop layer 7 so that it is difficult to certainly prevent the cracks occurred in the reinforcing hoop layer 7 from being propagated to the tube. The peel strength is preferably within an range of 0.5-2.5 kN/m.

In addition, the reinforced air bladder 1 includes a protection layer 12 having a wider width than that of the reinforced air bladder. The protection layer 12 is preferably made of high elongation material and formed separately from the tube 6 or bonded to the tube 6 with peel strength of not more than 4 kN/m. In the runflat running condition, the tube 6 may be penetrated by a foreign object invaded through a punctured portion into the tire or may rub against the inner surface of the tire to be damaged. However, by providing the protection layer 12, portions of the tube having not provided with the reinforcing hoop layer can also be prevented from the penetration of the foreign object or rubbing against the inner surface of the tire. Moreover, as the protection layer 13 is made from the high elongation material and follows the deformation when the internal pressure of the tire is dropped, a rapid radial expansion of the reinforced air bladder is not deteriorated and the protection layer deforms to surround the foreign object when the foreign object penetrates the protection layer, so that there is few chances of causing cracks. When the protection layer 13 is formed separately from the tube 6 and tightly attached to the tube by means of an engagement or the like, the protection layer 13 and the tube 6 is separated, so that, even in the case of occurring cracks, it is possible to effectively suppress a propagation of the cracks of the protection layer 13 to the tube 6 and improve the durability of the reinforcing air bladder under the runflat running condition. Alternatively, if separately formed protection layer and tube may affect the workability of mounting the reinforcing air bladder to the rim due to the shape of the reinforced air bladder or the like, the protection layer 13 is tightly attached to the tube with a weak peel strength of not more than 4 kN/m by glue, double faced adhesive tape or the like. As a result, even when cracks occur in the protection layer 13, the protection layer 13 and the tube 6 is separated and thus the cracks cannot reach to the tube 6, so that it is possible to effectively suppress a propagation of the cracks of the protection layer 13 to the tube 6 and improve the durability of the reinforcing air bladder under the runflat running condition. More preferably, the protection layer 13 is made of polyethylene, polypropylene, butyl rubber, fiber-reinforced rubber, elastomer or the like.

Figure 10:
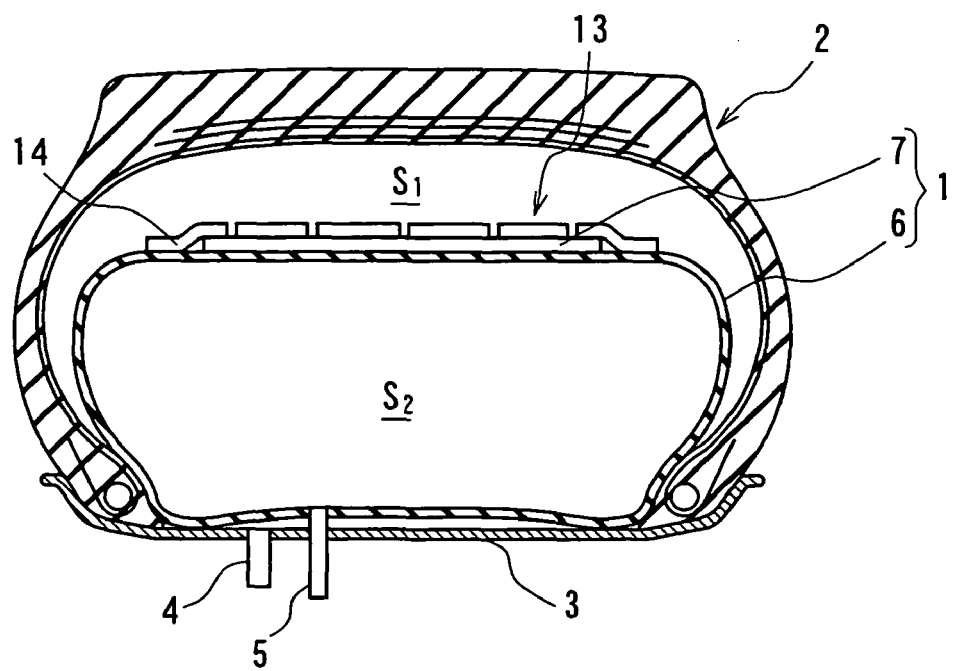
FIG. 10 is a widthwise sectional view of a safety tire accommodating another reinforced air bladder according to the present invention showing in a state where the safety tire is equipped on a rim and filled with a given internal pressure.

In addition, from the view point of facilitating the rigidity control of the protection layer, the protection layer preferably consists of a plurality of ring members or a ribbon member rather than a single sheet member. More specifically, as shown in FIG. 10, the protection layer 13 preferably consists of at least two ring members, e.g. six ring members 6 in FIG. 10, arranged in parallel with each other. This makes it possible to build the ring members 8 on one or more arcuate segment, and thus enables to downscale the building equipment.

Figure 11:
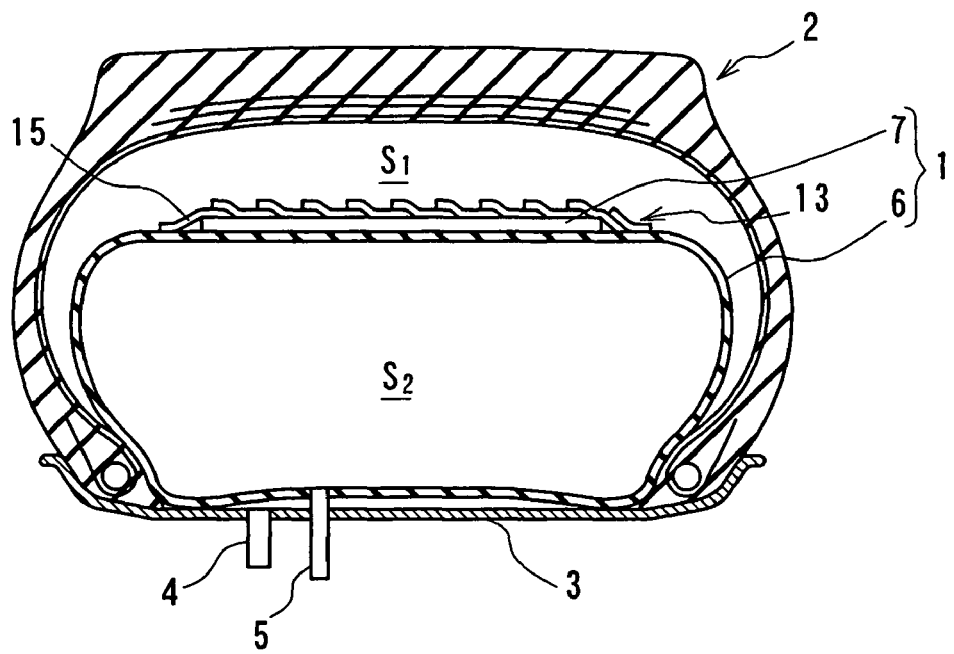
FIG. 11 is a widthwise sectional view of a safety tire accommodating another reinforced air bladder according to the present invention showing in a state where the safety tire is equipped on a rim and filled with a given internal pressure.

Alternatively, as shown in FIG. 11, the protection layer 13 is preferably formed by spirally winding the ribbon member 10. This eliminates the need of building the reinforcing hoop layer on the flexible tube and enables to build the reinforcing hoop layer 7 on an annular rigid supporting body, so that a stable operation can be realized.

As a means for forming the protection layer 12 from the ring member or the ribbon member, a means similar to the means for forming the reinforcing hoop layer 7 from these members may be used.

Figure 12:
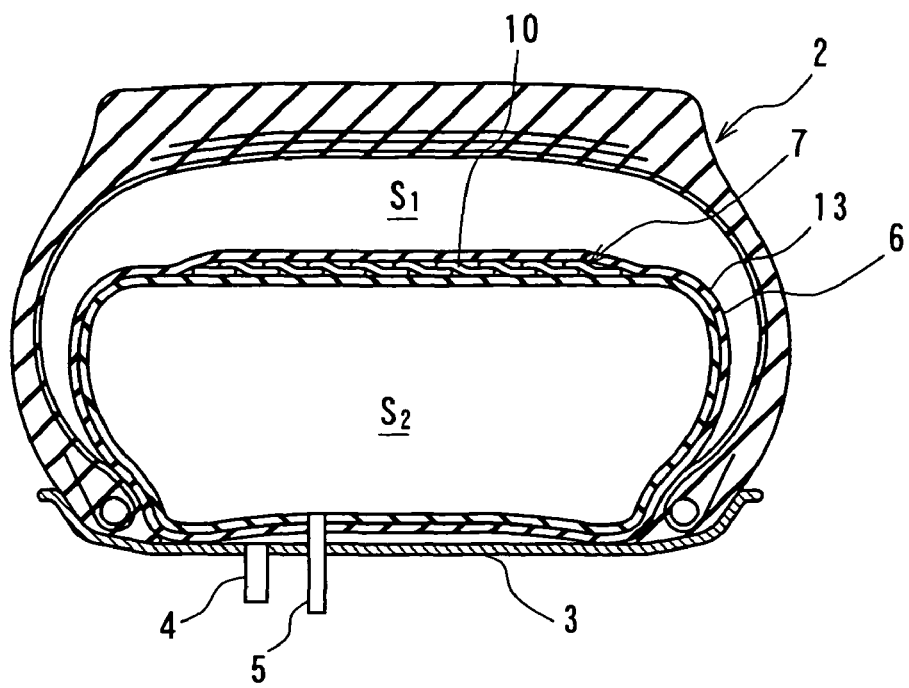
FIG. 12 is a widthwise sectional view of a safety tire accommodating another reinforced air bladder according to the present invention showing in a state where the safety tire is equipped on a rim and filled with a given internal pressure.

As shown in FIG. 12, the protection layer 13 preferably surrounds entirely the whole tube 6 over the entire lap. With such an arrangement of the protection layer 13, penetration of the foreign object and rubbing against the internal surface can be prevented in the side, bead and base portions, so that the durability of the reinforced air bladder under the runflat running condition is further improved.

Figure 13:
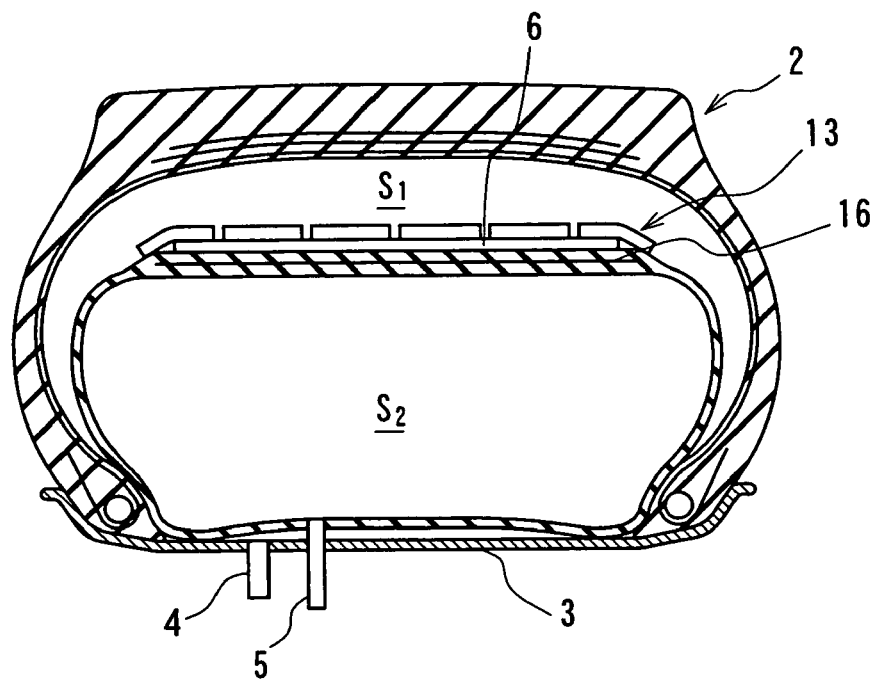
FIG. 13 is a widthwise sectional view of a safety tire accommodating another reinforced air bladder according to the present invention showing in a state where the safety tire is equipped on a rim and filled with a given internal pressure.

Further, as shown in FIG. 13, the tube 6 is preferably provided on the crown portion with strengthening layer 16 having non-woven fabric, short fiber or organic fiber cords aligned in the same direction. This is because the organic cords also bear the tension to further improve the durability of the reinforced air bladder under the runflat running condition.

Figure 14:
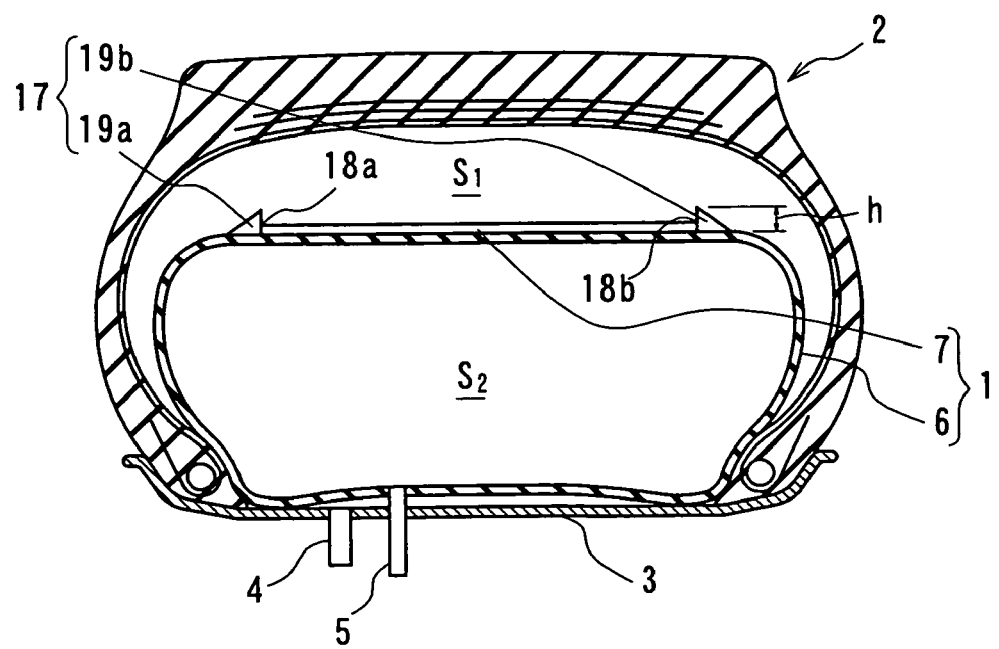
FIG. 14 is a widthwise sectional view of a safety tire accommodating another reinforced air bladder according to the present invention showing in a state where the safety tire is equipped on a rim and filled with a given internal pressure.

Due to a fluctuation in manufacturing the reinforcing hoop layer and the tube or a deviation of the reinforcing hoop layer during the process for attaching it to the tube, uneven tension may be applied to the reinforcing hoop layer. In addition, when the reinforcing hoop layer and the tube are separated, the reinforcing hoop layer may be displaced in its width direction while the safety tire is driven. In this state, a large tension may be applied locally to the reinforcing hoop layer and, as the result, a larger creep deformation may be caused. Under the condition where the uneven tension is applied, the reinforced air bladder cannot be radially expanded in a uniform manner and it expands unsymmetrical in the width direction when the internal pressure of the tire is dropped. Thus, the reinforced air bladder may be damaged in the early stage of the runflat running condition on the side where the reinforced air bladder is largely expanded and thus a desired durability under the runflat running condition cannot be obtained. From the view point of preventing such a displacement of the reinforcing hoop layer in the width direction, as shown in FIG. 14, means 17 for preventing a displacement to prevent the reinforcing hoop layer from moving in the width direction is preferably provided on the outer circumference surface of the tube 6. This make it possible to avoid the displacement in the width direction of the reinforcing hoop layer 7 and the tension is dispersed evenly even when used for a long period, so that the stable durability of the reinforced air bladder 1 can be obtained.

The means 17 for preventing a displacement are preferably clipping projections 19a, 19b which are arranged on two circumferential lines each passing through an outer circumferential point of the tube contacting each of the edges 18a, 18b of the reinforcing hoop layer. By providing the displacement preventing means 17 as the clipping projections 19a, 19b, the reinforcing hoop layer 7 can be relatively easily attached to the tube 6. The clipping projections 19a, 19b can be readily formed by fabricating the mold corresponding to the desired shape and shaping the tube 6 with this mold during the vulcanization.

Figure 15:
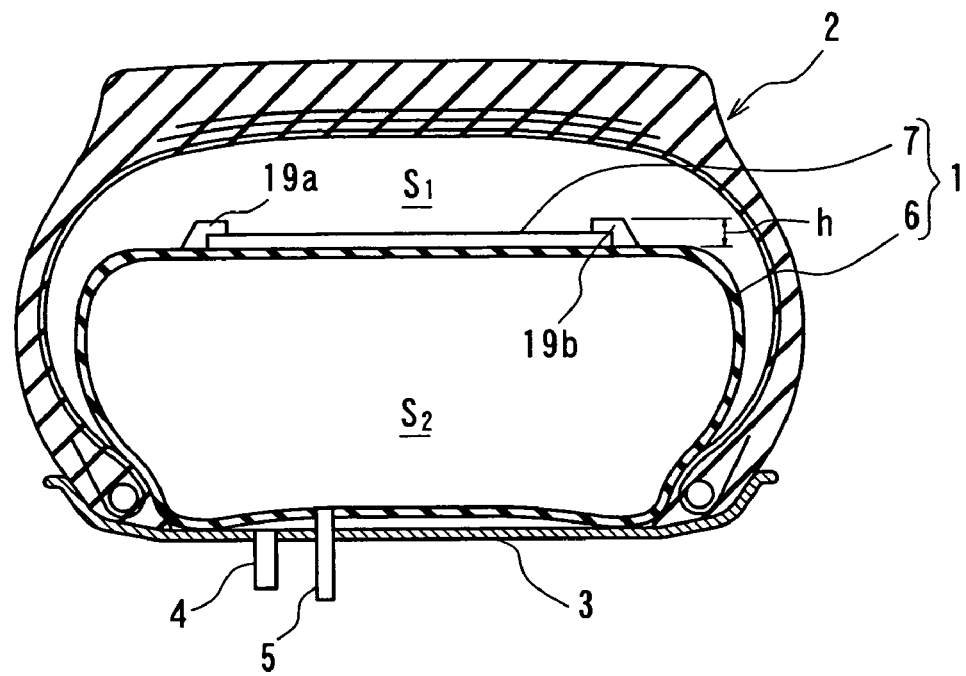
FIG. 15 is a widthwise sectional view of a safety tire accommodating another reinforced air bladder according to the present invention showing in a state where the safety tire is equipped on a rim and filled with a given internal pressure.
Figure 16:
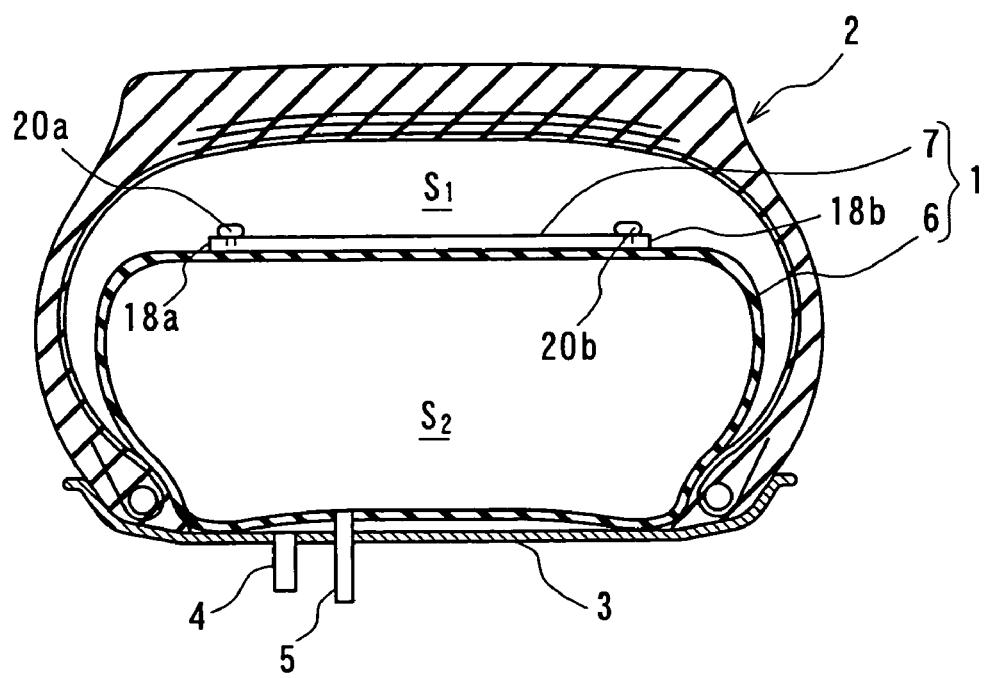
FIG. 16 is a widthwise sectional view of a safety tire accommodating another reinforced air bladder according to the present invention showing in a state where the safety tire is equipped on a rim and filled with a given internal pressure.

From the view point of facilitating the manufacturing, as shown in FIG. 14, the clipping projections 19a, 19b preferably have a ridge shape extending in the radial direction of the tube. From the view point of surely preventing the displacement of the reinforcing hoop layer 7, as shown in FIG. 15, they have a hook shape with its tip portion bending and extending inwardly in the width direction of the reinforced air bladder 1. In either cases, the height h of the clipping projections 19a, 19b is preferably within the range of 150%-500% of the thickness of the reinforcing hoop layer 7.

Figure 17:
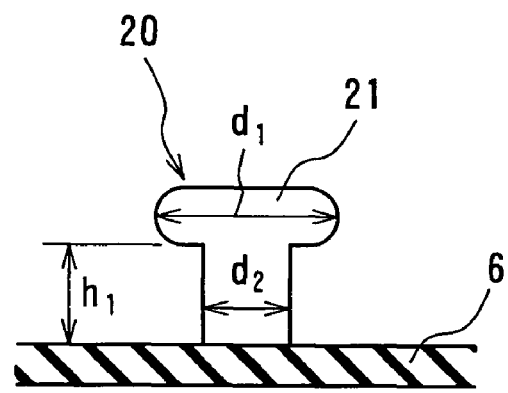
FIG. 17 is an enlarged sectional view of a through projection.

Alternatively, the means 17 for preventing a displacement is preferably at least two through projections 20a, 20b which are arranged on two circumferential line each passing through outer circumferential points of the tube 6 near the edges 18a, 18b of the reinforcing hoop layer 7 and which extend through the reinforcing hoop layer 7 in the radial direction of the tube 6. Locking the reinforcing hoop layer 7 with the through projections 20a, 20b in this way may improve the accuracy of the positional relation between the tube 6 and the reinforcing hoop layer 7 in the width direction and thus may prevent the reinforcing hoop layer from offsetting. FIG. 17 is a enlarged side view of a part of the tube 6 and the through projection 20 showing in a state where the reinforcing hoop layer 7 has been removed. As shown in the figure, the through projection 20 preferably has an expanded portion 21 which has a larger diameter than that of the rest portion. The expanded portion 21 can prevent the reinforcing hoop layer 7 from slipping off from the through projection 11. From the view point of effectively preventing the slip-off of the reinforcing hoop layer 7, the height $h_1$ of the through projection 20 below the expanded portion 21 is preferably within the range of 105%-200% of the thickness of the reinforcing hoop layer 7 and the diameter $d_1$ of the expanded portion 21 is preferably within the range of 120%-150% of the diameter $d_2$ of the rest portion. As a means for locking the reinforcing hoop layer 7 to the through projection 21, prefabricating a hole, a slit or a combination thereof and engaging the through projection 20 therewith may be recited by way of example. In this connection, the diameter of the hole is preferably smaller than the diameter $d_1$ of the expanded portion 21 and larger than the diameter $d_2$ of the rest portion, in order to facilitate the locking and strengthen the fixing. The through projections 20a, 20b can be readily formed by fabricating the mold corresponding to the desired shape and shaping the tube 6 with this mold during the vulcanization.

Figure 18:
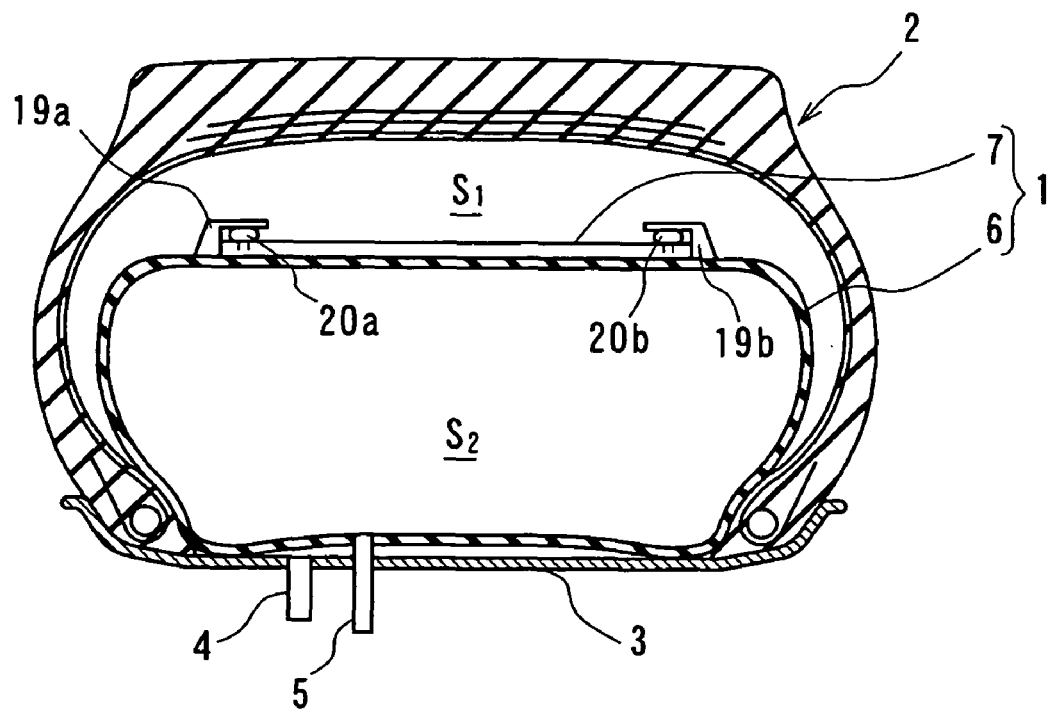
FIG. 18 is a widthwise sectional view of a safety tire accommodating another reinforced air bladder according to the present invention showing in a state where the safety tire is equipped on a rim and filled with a given internal pressure.
Figure 19:
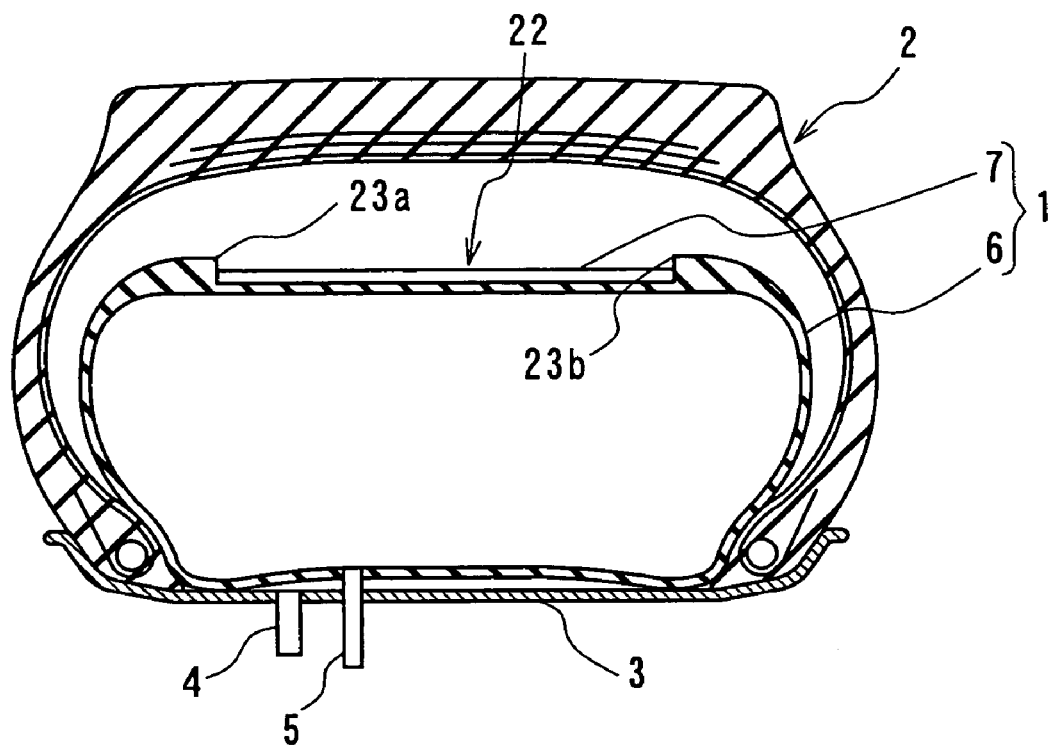
FIG. 19 is a widthwise sectional view of a safety tire accommodating another reinforced air bladder according to the present invention showing in a state where the safety tire is equipped on a rim and filled with a given internal pressure.

When it is desired to further surely prevent the displacement of the reinforcing hoop layer, as shown in FIG. 18, the displacement preventing means 17 may be combinations of the clipping projections 19a, 19b and the through projections 20a, 20b, respectively.

Alternatively, the displacement preventing means 17 may be side walls 23a, 23b of a recessed portion 22 shaped on the crown portion of the tube to be able to receive the reinforcing hoop layer 7. With providing the displacement preventing means 17 as the side walls 23a, 23b of the recessed portion 22, it is possible easily form the displacement preventing means 17 by shaping the tube 6 with the mold during the vulcanization.

Figure 20:
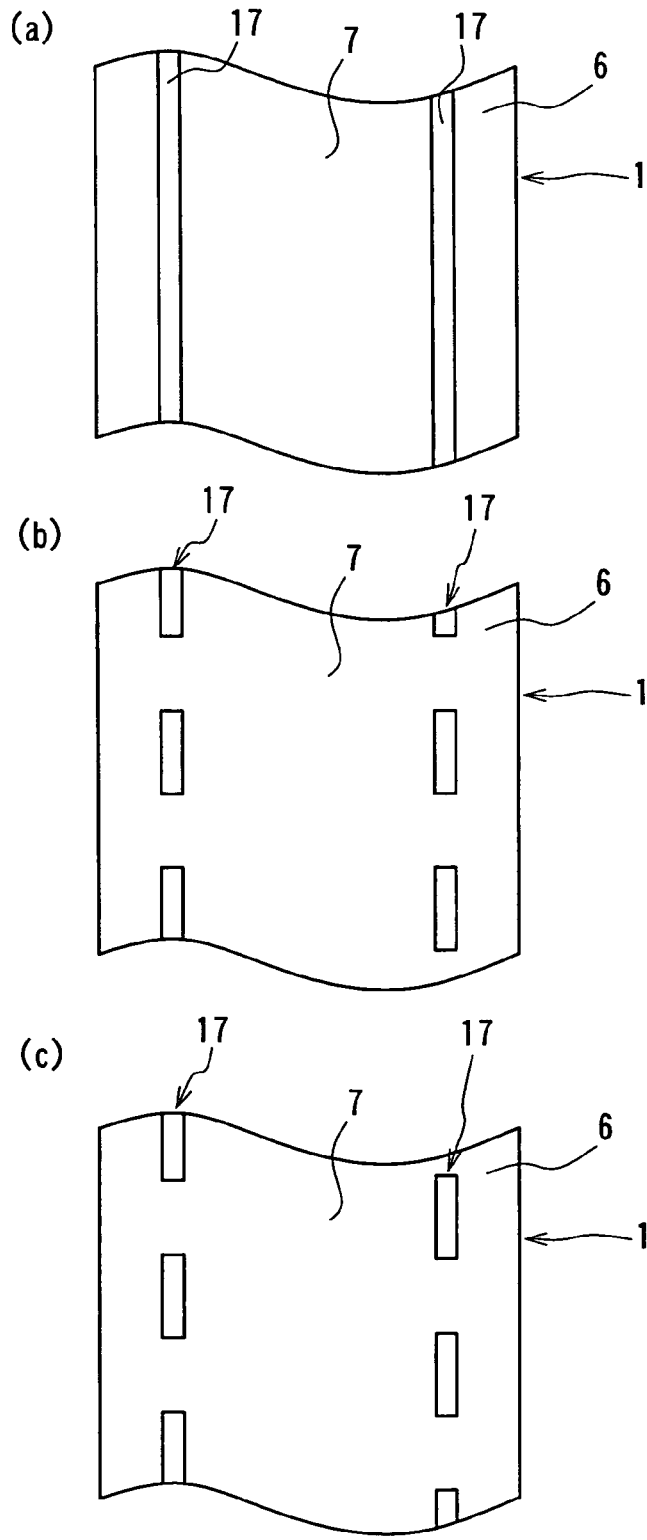
FIGS. 20(a)-(c) are development views of a part of a crown portion of various reinforced air bladder according to the present invention.

FIGS. 20(a)-(c) are development views of a part of the crown portion of the various reinforced air bladder according to the present invention. The displacement preventing means 17 may have a shape extending continuously in the circumferential direction of the reinforced air bladder 1, as shown in FIG. 20(a), or a shape extending intermittently in the circumferential direction of the reinforced air bladder 1, as shown in FIG. 20(b). In the latter case, the displacement preventing means 17 may be arranged with some shift between the right hand and left hand sides.

Figure 21:
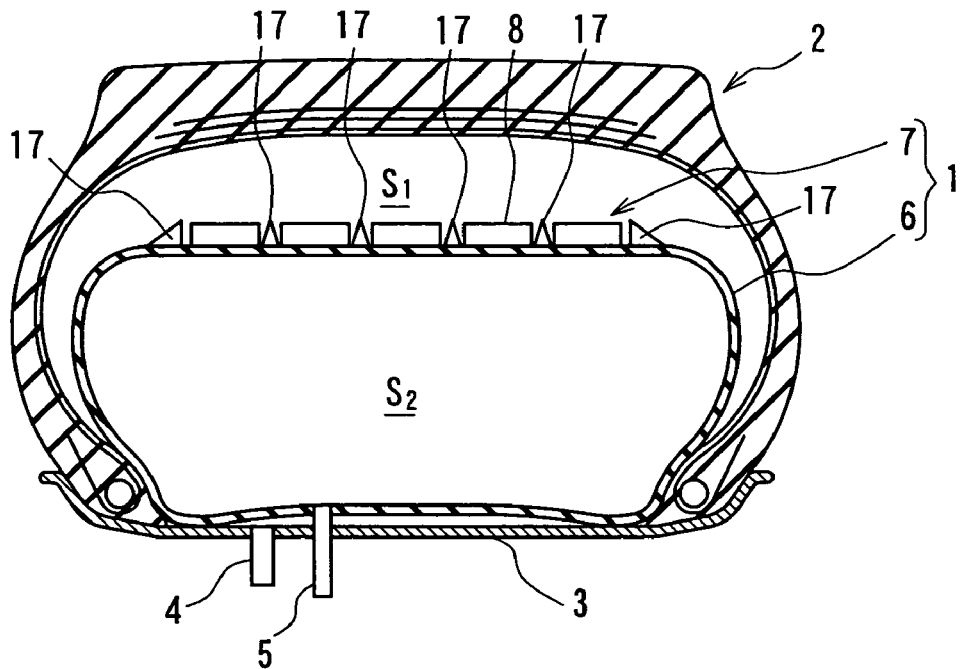
FIG. 21 is a widthwise sectional view of a safety tire accommodating another reinforced air bladder according to the present invention showing in a state where the safety tire is equipped on a rim and filled with a given intern-al pressure.

Furthermore, when the reinforcing hoop layer 7 is consist of ring members 8, as shown in FIG. 21, the displacement preventing means 17 may be arranged at the positions corresponding to the both edges of the ring members 8 in addition to the positions corresponding to the both edges of the reinforcing hoop layer.

Figure 22:
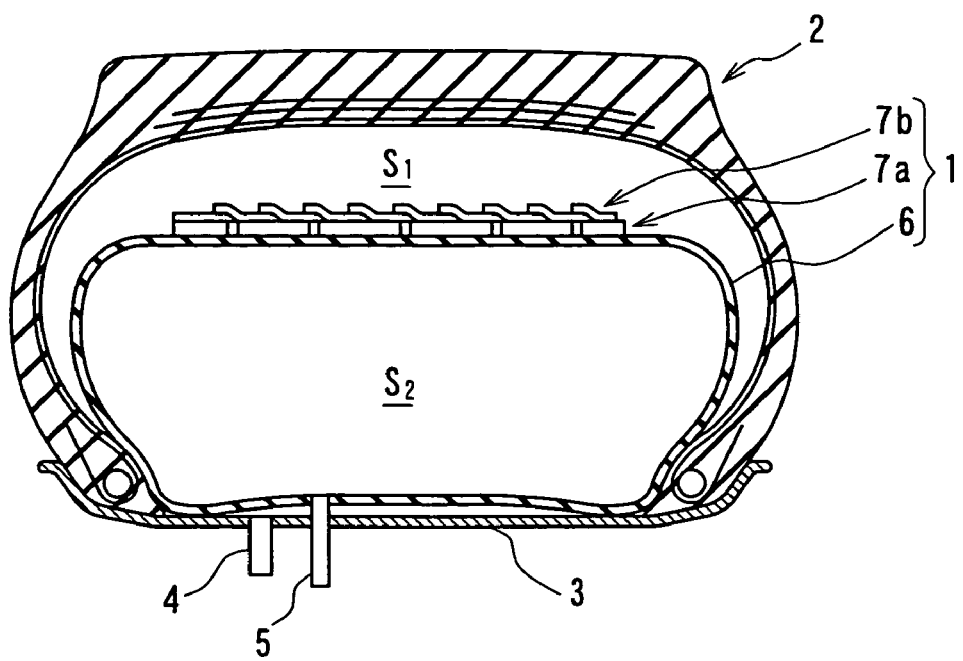
FIG. 22 is a widthwise sectional view of a safety tire accommodating another reinforced air bladder according to the present invention showing in a state where the safety tire is equipped on a rim and filled with a given internal pressure.
Figure 23:
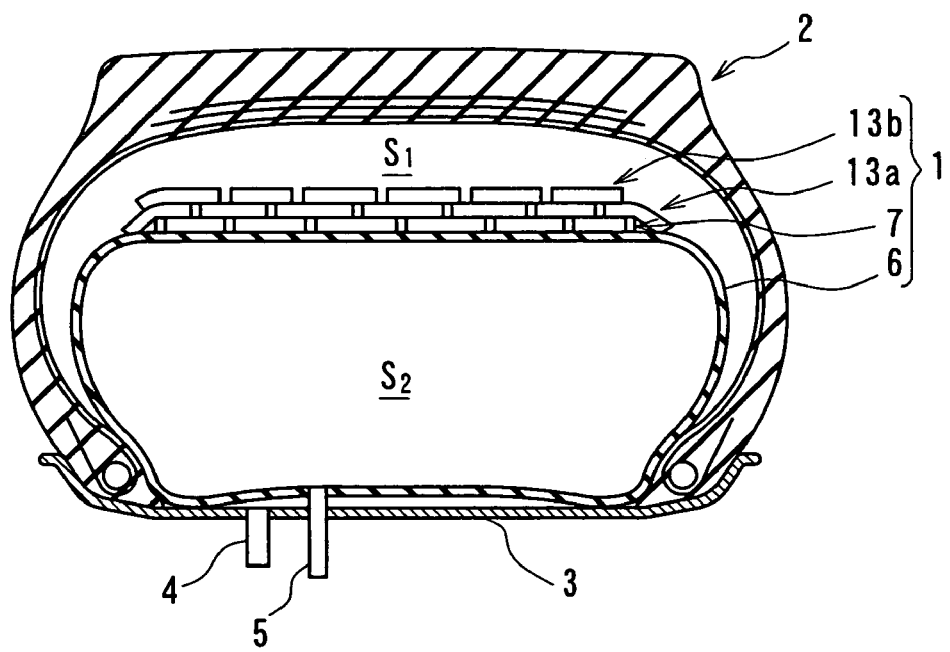
FIG. 23 is a widthwise sectional view of a safety tire accommodating another reinforced air bladder according to the present invention showing in a state where the safety tire is equipped on a rim and filled with a given internal pressure.
Figure 24:
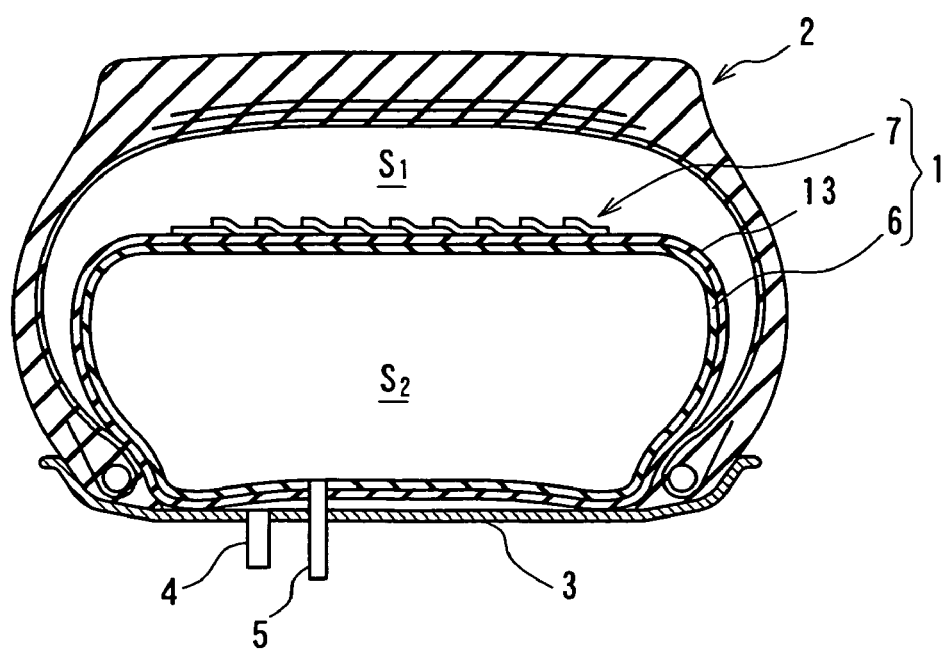
FIG. 24 is a widthwise sectional view of a safety tire accommodating another reinforced air bladder according to the present invention showing in a state where the safety tire is equipped on a rim and filled with a given internal pressure.

The descriptions above show only a part of the preferred embodiments of the present invention, and various modifications can be made within the scope of the appended claims. For example, the reinforcing hoop layer 7 is not limited to consist of a single layer, but is may consist of two or more hoop layers 7a, 7b, as shown in FIG. 22, depending on the required rigidity. Also, the protection layer 13 is not limited to consist of a single layer, but it may consist of two or more protection layers 13a, 13b, as shown in FIG. 23. Further, the arranging position of the protection layer 13 is not limited to the outer circumferential side of the reinforcing hoop layer 7, but it may be arranged between the reinforcing hoop layer 7 and the tube 6, as shown in FIG. 24.

EXAMPLES

Reinforced air bladders for safety tires according to the present invention are experimentally manufactured and evaluated their performances. The details will be described below.

Experiment 1

The reinforced air bladder of Examples 1-6 are air bladders for safety tires having tire size of 495/45R22.5. In these air bladders, a reinforcing hoop layer surrounds an entire outer circumference of a crown portion of an air-impermeable tube made of butyl rubber with the thickness of 3.5 mm over an entire lap and the reinforcing hoop layer is formed separately from the tube. The tube has the width of 400 mm, outer diameter of 800 mm, and inner diameter of 575 mm. Tensions acting on the tube when the internal pressure of 5% of a given air pressure of the tire and when the internal pressure identical to the given pressure of the tire are 28 N/m and 560 N/m, respectively. The reinforced air bladders of Example 1-6 also have specifications shown in Table 1 and described in the below.

The reinforcing hoop layer of the reinforced air bladder of Example 1 consists of a ring member having the width of 300 mm and made of polyethylene terephthalate with the thickness of 2 mm. The reinforcing hoop layer of the reinforced air bladder of Example 2 consists of five ring members arrange side by side. Each of the ring members is formed by winding a ribbon member made of polyethylene terephthalate with the thickness of 1 mm and the width of 60 mm in the circumferential direction to form an overlapping portion over one lap and then thermally welding the overlapping portion at three points spaced 120 deg. in the circumferential direction. The reinforcing hoop layers of the reinforced air bladders of Examples 3-6 are formed by spirally winding a ribbon member with making an overlapping portion having the width of a half of that of the ribbon member. The ribbon member is made of polyethylene terephthalate with the thickness of 1 mm and the width of 30 mm and the widths of the reinforcing hoop member are 300 mm (Example 3), 250 mm (Example 4), 200 mm (Example 5) and 150 mm (Example 6).

For the purpose of comparison, a reinforced air bladder of Conventional Example is also experimentally manufactured. The air bladder of Conventional Example is for safety tire of the tire size of 495/45R22.5, uses the same tube as those of Examples 1-13, has five reinforcing hoop layers (width: 300 mm) formed by rubber coating a non-woven aramid fabric having a weight per unit area of 50 $g/m^2$ which layers are bonded to the outer circumference of the crown portion over an entire lap by vulcanization, and have specifications shown in Table 1.

For the reinforced air bladders of Examples 1-6 and Conventional Example, the following items are evaluated.

1. Weight of the Reinforced Air Bladder

The weight of each testing reinforced air bladder is measured. The evaluation results are shown in Table 1. It is noted that the evaluation results are shown in index values with the result of Conventional Example being set to 100. The smaller the index value is, the smaller the weight is.

2. Rate of the Radial Growth of the Reinforced Air Bladder

Before accommodating in the tire, each of the testing reinforced air bladders is applied internal pressures of 0.1 kPa (relative pressure) and 70 kPa (relative pressure). The outer diameter is measured for each of these internal pressures. The rate of the radial growth is evaluated from the ratio of the outer diameter at the internal pressure of 70 kPa to the outer diameter at the internal pressure of 0.1 kPa. The evaluation results are shown in Table 1.

3. Durability of the Reinforced Air Bladder

Each of the testing reinforced air bladders is accommodated in a tire having the tire size of 495/45R22.5 and then the tire accommodating the reinforced air bladder is mounted on a rim having the rim size of 17.00×22.5 to form a tire wheel. For this tire wheel, the internal pressure of the tire (space $S_1$) accommodating the reinforced air bladder is set to 900 kPa (relative pressure) and the internal pressure of the reinforced air bladder (space $S_2$) is set to 970 kPa (relative pressure). Then, the tire wheel is installed on a drum-testing machine to travel 30,000 km under the condition of the tire load of 49 kN and testing speed of 60 km/h. After the test run, the tire wheel is disassembled and the reinforced air bladder is taken out to visually inspect any damage for the evaluation of the durability. The results are shown in Table 1.

TABLE 1

|  | Reinforcing hoop layer | | | Result of evaluation | | |
|---|---|---|---|---|---|---|
|  | Structure | Width | Creep deformation rate | Weight | Radial growth rate | Durability |
| Conventional Example | — | 300 mm | 10.0% | 100 | 12.0% | Damaged |

TABLE 1-continued

|  | Reinforcing hoop layer | | | Result of evaluation | | |
|---|---|---|---|---|---|---|
|  | Structure | Width | Creep deformation rate | Weight | Radial growth rate | Durability |
| Example 1 | FIG. 1 | 300 mm | 1.8% | 60 | 2.4% | No damage |
| Example 2 | FIG. 4 | 300 mm | 1.8% | 58 | 2.4% | No damage |
| Example 3 | FIG. 6 | 300 mm | 1.5% | 60 | 0.5% | No damage |
| Example 4 | FIG. 6 | 250 mm | 2.5% | 56 | 3.8% | No damage |
| Example 5 | FIG. 6 | 200 mm | 3.4% | 52 | 5.2% | No damage |
| Example 6 | FIG. 6 | 150 mm | 4.0% | 48 | 8.0% | No damage |

From the results of evaluation shown in Table 1, it is understood that the reinforced air bladder of all of Examples 1-6 are lighter and have smaller radial grow rate and better durability as compared with those of Conventional Example.

Experiment 2

The reinforced air bladder of Examples 7-14 are air bladders for safety tires having tire size of 495/45R22.5. In these air bladders, a reinforcing hoop layer surrounds an entire outer circumference of a crown portion of an air-impermeable tube made of butyl rubber with the thickness of 3.5 mm over an entire lap and the reinforcing hoop layer is formed separately from the tube. The tube has the width of 400 mm, outer diameter of 800 mm, and inner diameter of 575 mm. Tensions acting on the tube when the internal pressure of 5% of a given air pressure of the tire and when the internal pressure identical to the given pressure of the tire are 28 N/m and 560 N/m, respectively. The reinforced air bladders of Example 7-14 also have specifications shown in Table 2 and described in the below.

The reinforcing hoop layer of the reinforced air bladder of Example 7 consists of a ring member having the width of 300 mm and made of polyethylene terephthalate with the thickness of 2 mm. The reinforcing hoop layer of the reinforced air bladder of Example 8 consists of five ring members arrange side by side. Each of the ring members is formed by winding a ribbon member made of polyethylene terephthalate with the thickness of 1 mm and the width of 60 mm in the circumferential direction to form an overlapping portion over one lap and then thermally welding the overlapping portion at three points spaced 120 deg. in the circumferential direction. The reinforcing hoop layer of the reinforced air bladder of Example 9 is formed by spirally winding a ribbon member with making an overlapping portion having the width of a half of that of the ribbon member. The ribbon member is made of polyethylene terephthalate with the thickness of 1 mm and the width of 30 mm and the width of the reinforcing hoop member is 300 mm. The reinforcing hoop layer of the reinforced air bladder of Example 10 is formed by spirally winding a ribbon member with making an overlapping portion having the width of a half of that of the ribbon member. The ribbon member is made of a composite material of polypropylene and talc with the thickness of 1 mm and the width of 30 mm and the width of the reinforcing hoop member is 300 mm.

Each of the reinforced air bladders of Examples 11 and 12 has reinforcing hoop layer consisting of a ring member made of polyethylene terephthalate with the thickness of 2 mm and the width of 300 mm. On the outer circumference of the reinforcing hoop layer, there is provided a protection layer consisting of the ring member with the width of 320 mm. The protection layer is formed separately from the tube (Example 11) or bonded to the tube with the peel strength of 2 kN/m (Example 12). The reinforcing hoop layer of the reinforced air bladder of Example 13 is formed by spirally winding a ribbon member with making an overlapping portion having the width of a half of that of the ribbon member. The ribbon member is made of polyethylene terephthalate with the thickness of 1 mm and the width of 30 mm and the width of the reinforcing hoop member is 300 mm. On the outer circumference of the reinforcing hoop layer, there is provided a protection layer made of rubber with the thickness of 3 mm to surround entirely the tube over an entire lap. The protection layer is bonded to the tube with the peel strength of 2 kN/m. The reinforced air bladder of Example 14 is provided with a strengthening layer made of non-woven fabric on the crown portion of the tube. The reinforcing hoop layer consists of a ring member made of polyethylene terephthalate with the thickness of 2 mm and the width of 300 mm. On the outer circumference of the reinforcing hoop layer, there is provided a protection layer consisting of six ring member arranged side by side. The ring member is formed by winding a ribbon member made of polypropylene with the thickness of 1 mm and the width of 60 mm in the circumferential direction to form an overlapping portion over one lap and the thermally welding the overlapping portion at three points spaced 120 deg. in the circumferential direction. The protection layer is bonded to the tube with the peel strength of 4 kN/m.

For the reinforced air bladders of Examples 7-14, the following items are evaluated.

1. Weight of the Reinforced Air Bladder

The weight of each testing reinforced air bladder is measured. The evaluation results are shown in Table 2. It is noted that the evaluation results are shown in index values with the result of Conventional Example being set to 100. The smaller the index value is, the smaller the weight is.

2. Durability of the Reinforced Air Bladder Under the Normal Running Condition

Each of the testing reinforced air bladders is accommodated in a tire having the tire size of 495/45R22.5 and then the tire accommodating the reinforced air bladder is mounted on a rim having the rim size of 17.00×22.5 to form a tire wheel. For this tire wheel, the internal pressure of the tire (space $S_1$) accommodating the reinforced air bladder is set to 900 kPa (relative pressure) and the internal pressure of the reinforced air bladder (space $S_2$) is set to 970 kPa (relative pressure). Then, the tire wheel is installed on a drum-testing machine to travel 30,000 km under the condition of the tire load of 49 kN and testing speed of 60 km/h. After the test run, the tire wheel is disassembled and the reinforced air bladder is taken out to visually inspect any damage for the evaluation of the durability. The results are shown in Table 2.

3. Durability of the Reinforced Air Bladder Under the Runflat Running Condition

Each of the testing reinforced air bladders is accommodated in a tire having the tire size of 495/45R22.5 and then the tire accommodating the reinforced air bladder is mounted on a rim having the rim size of 17.00×22.5 to form a tire wheel. From the tire wheel, a valve core of the tire accommodating the reinforced air bladder is removed to recreate the runflat running condition. The internal pressure of the cavity $S_1$ is set to 0 kPa (relative pressure) and the internal pressure of the reinforced air bladder (space $S_2$) is set to 400 kPa (relative pressure). Then, the tire wheel is installed on a drum-testing machine to travel under the condition of the tire load of 49 kN and testing speed of 60 km/h. The traveling distance until the tire is destroyed is measured and the measured value is used for the evaluation of the durability. The results are shown in Table 2. The evaluation results are shown in index values with the result of Conventional Example being set to 100. The larger the index value is, the higher the durability is.

TABLE 2

Figure 9:
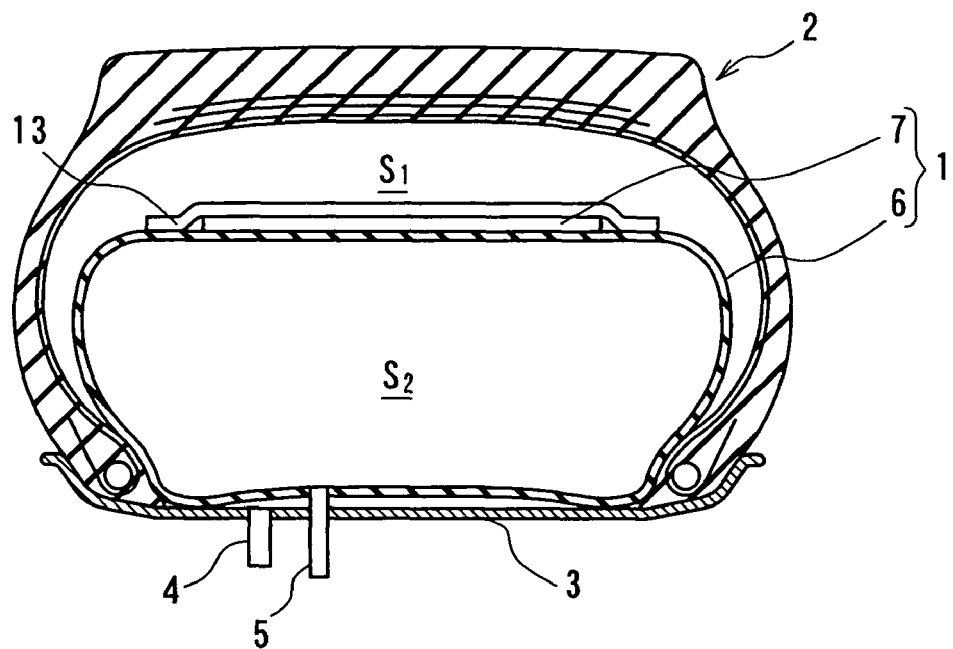
FIG. 9 is a widthwise sectional view of a safety tire accommodating another reinforced air bladder according to the present invention showing in a state where the safety tire is equipped on a rim and filled with a given internal pressure.

| | | Result of evaluation | | |
|---|---|---|---|---|
| | Structure | Creep deformation rate of reinforced hoop layer | Weight | Durability under normal running condition | Durability under runflat running condition |
| Conventional Example | — | 10.0% | 100 | Damaged | 100 |
| Example 1 | FIG. 1 | 1.8% | 60 | No damage | 100 |
| Example 7 | FIG. 1 | 1.8% | 60 | No damage | 120 |
| Example 8 | FIG. 4 | 1.8% | 58 | No damage | 120 |
| Example 9 | FIG. 6 | 1.5% | 60 | No damage | 160 |
| Example 10 | FIG. 6 | 1.0% | 60 | No damage | 120 |
| Example 11 | FIG. 9 | 1.8% | 65 | No damage | 200 |
| Example 12 | FIG. 9 | 1.8% | 68 | No damage | 200 |
| Example 13 | FIG. 12 | 1.5% | 68 | No damage | 200 |
| Example 14 | FIG. 13 | 1.8% | 75 | No damage | 200 |

From the results of evaluation shown in Table 2, it is understood that the reinforced air bladder of all of Examples 7-14 are lighter and have smaller radial grow rate and better durability under the normal and runflat running conditions as compared with those of Conventional Example. It is also understood that the reinforced air bladder of all of Examples 7-14 have better 20 durability under the runflat running condition as compared with that of Example 1.

Experiment 3

The reinforced air bladder of Examples 15-20 are air bladders for safety tires having tire size of 495/45R22.5. In these air bladders, a reinforcing hoop layer surrounds an entire outer circumference of a crown portion of an air-impermeable tube made of butyl rubber with the thickness of 3.5 mm over an entire lap and the reinforcing hoop layer is formed separately from the tube. The tube has the width of 400 mm, outer diameter of 800 mm, and inner diameter of 575 mm. The reinforced air bladders of Example 15-20 also have specifications shown in Table 3 and described in the below.

The reinforcing hoop layer of the reinforced air bladder of Example 15 consists of a ring member having the width of 300 mm and made of polyethylene terephthalate with the thickness of 1.5 mm, and is tightly attached to the tube without any bonding. Also, there are provided a pair of ridge-like clipping projections on two circumferential lines each passing through outer circumferential points of the tube near the edges of the reinforcing hoop layer. Each of the clipping projections have the height of 2 mm and are formed in a shape continuously extending in the circumferential direction, as shown in FIG. 20(a).

The reinforcing hoop layers of the reinforced air bladders of Example 16 are formed by spirally winding a ribbon member with making an overlapping portion having the width of 20 mm. The ribbon member is made of polyethylene terephthalate with the thickness of 0.3 mm and the width of 40 mm. The overlapping portion is bonded with an acrylic adhesive tape having the width of 20 mm and the thickness of 0.12 mm. Also, there are provided hook-like clipping projections on two circumferential line each passing through outer circumferential points of the tube near the edges of the reinforcing hoop layer. Each of the clipping projections have the height of 2 mm and are formed in such a shape that the tip portion bends and extends inwardly by 5 mm in the width direction of the reinforced air bladder.

The reinforcing hoop layers of the reinforced air bladders of Example 17 are formed by spirally winding a ribbon member with making an overlapping portion having the width of 20 mm. The ribbon member is made of polyethylene terephthalate with the thickness of 0.3 mm and the width of 40 mm. The overlapping portion is bonded with an acrylic adhesive tape having the width of 20 mm and the thickness of 0.12 mm. Then, holes with the diameter of 6 mm are formed at the positions corresponding to the through projections. Also, there are provided through projections on two circumferential line each passing through outer circumferential points of the tube near the edges of the reinforcing hoop layer. Each of the through projections has the diameter of 7 mm at the expanded portion, the diameter of 5 mm at the rest portion and the height of 1 mm below the expanded portion. Eight projections are evenly spaced on one circumferential line.

The reinforced air bladder of Example 18 has the same hook-like clipping projections as in Example 16, the same through projections as in Example 17 and the same reinforcing hoop layer as in Example 17.

The reinforced air bladder of Example 19 has the same ridge-like clipping projections as in Example 15 and the same reinforcing hoop layer as in Example 16. The outer circumferential surface of the reinforcing hoop layer is entirely surrounded by a rubber reinforcing band having the thickness of 1.5 mm and the width of 300 mm.

The reinforced air bladder of Example 20 has the same reinforcing hoop layer as in Example 15, but does not have any displacement preventing means. Instead, the tube and the reinforcing hoop layer are bonded with an acrylic adhesive tape having the thickness of 0.12 mm.

Each of the testing reinforced air bladders is accommodated in a tire having the tire size of 495/45R22.5 and then the tire accommodating the reinforced air bladder is mounted on a rim having the rim size of 17.00×22.5 to form a tire wheel. For this tire wheel, the internal pressure of the tire (space $S_1$) accommodating the reinforced air bladder is set to 900 kPa (relative pressure) and the internal pressure of the reinforced air bladder (space $S_2$) is set to 970 kPa (relative pressure). Then, the tire wheel is installed on a drum-testing machine to travel 30,000 km under the condition of the tire load of 49 kN and testing speed of 60 km/h.

After traveling 30,000 km, the outward appearances of the tire wheels are visually inspected. As a result, there are no changes found for the tire wheels using the reinforced air bladder of Examples 15-19. In the tire wheel using the reinforced air bladder of Example 20, the shapes of the sidewall portions are asymmetric between the right hand side and the left hand side. So the tire wheel using the reinforced air bladder of Example 20 is subjected to the CT scanning, and it is found that the reinforced air bladder is unevenly expanded and only one side thereof touches the inner surface of the tire. Further, the tire wheel is disassembled and the reinforced air bladder is taken out to visually inspect. As a result, it is found that the reinforcing hoop layers in the reinforced air bladder of Examples 15-19 are not displaced, and that the reinforcing hoop layer in the reinforced air bladder of Example 20 is displaced by about 30 mm in the width direction and a part of the tube is worn due to the contact with the inner surface of the tire. Accordingly, it is shown that the reinforced air bladder of Examples 15-19 have better durability as compared with the air bladder of Example 20.

INDUSTRIAL APPLICABILITY

According to the present invention, it is possible to provide a reinforced lightweight air bladder for a safety tire in which the reinforcing layer is optimized to be able to effectively suppress a radial growth under the normal running condition even if it is used for a long tire and, on the other hand, to suppress an occurrence of a crack in a tube under the runflat running condition, thereby exhibiting a superior durability.

The invention claimed is:

1. A hollow toric reinforced air bladder which is to be accommodated in a tire and filled with air at an internal pressure determined in relation to a given air pressure of the tire to form a cavity at least between an inner surface of the tire and the bladder under a normal internal pressure state of the tire and to radially expand with a decrease in the internal pressure of the tire to take over load support from the tire, said reinforced air bladder comprising:
an air-impermeable tube; and
a reinforcing hoop layer surrounding entirely an outer circumference of a crown portion of the tube,
wherein the reinforcing hoop layer is made of a low tension resistance material having a creep deformation rate of not more than 5% under a condition where a tension which is the same magnitude as a tension acting on a tube filled with the internal pressure corresponding to 5% of the given air pressure of the tire is applied at the testing temperature of 80 deg.C.,
wherein the reinforced air bladder further comprises a protection layer consisting of at least two ring members and having a wider width than that of the reinforcing hoop layer on the outer circumference of the crown portion of the tube, and the protection layer is made of a high elongation material and formed separately from the tube.

2. The reinforced air bladder according to claim 1, wherein the low tension resistance material has an elongation rate of not less than 20% under a condition where a tension which is the same magnitude of a tension acting on a reinforced air bladder filled with the internal pressure identical to the given air pressure is applied.

3. The reinforced air bladder according to claim 1, wherein the yield strength a of the low tension resistance material is larger than the tension acting on the reinforced air bladder filled with the internal air pressure corresponding to 5% of the given tire pressure, and is smaller than the tension acting on the reinforced air bladder filled with the given air pressure of the tire.

4. The reinforced air bladder according to claim 1, wherein the breaking strength of the low tension resistance material is larger than the tension acting on the tube filled with the internal air pressure corresponding to 5% of the given tire pressure, and is smaller than the tension acting on the tube filled with the given air pressure of the tire.

5. The reinforced air bladder according to claim 1, wherein the low tension resistance material is a resin.

6. The reinforced air bladder according to claim 1, wherein the low tension resistance material is a composite material of cords and rubber.

7. The reinforced air bladder according to claim 1, wherein the reinforcing hoop layer consists of at least two ring members arranged side by side.

8. The reinforced air bladder according to claim 7, wherein each of the ring members of the reinforcing hoop layer is formed by circumferentially winding a ribbon member with making an overlapping portion extending over at least one lap and the ribbon member is bonded to itself at least one part of the overlapping portion.

9. The reinforced air bladder according to claim 1, wherein the reinforcing hoop layer is formed by spirally winding a ribbon member.

10. The reinforced air bladder according to claim 1, wherein the reinforcing hoop layer consists of at least two ring members arranged side by side wherein each ring member of the reinforcing hoop layer is formed by spirally winding a ribbon member.

11. The reinforced air bladder according to claim 1, wherein the reinforcing hoop layer is laid within a region of 50-95% of the tube width with the central plane in the width direction being as its center on the reinforced air bladder filled with an internal pressure of 5% of the given air pressure of the tire.

12. The reinforced air bladder according to claim 1, wherein the reinforcing hoop layer is formed separately from the tube.

13. The reinforced air bladder according to claim 1, wherein the reinforcing hoop layer is bonded to the tube with peel strength of not more than 4 kN/m.

14. The reinforced air bladder according to claim 1, wherein the protection layer may be made of a high elongation material and bonded to the tube with peel strength of not more than 4 kN/m.

15. The reinforced air bladder according to claim 1, wherein the protection layer is formed by spirally winding a ribbon member.

16. The reinforced air bladder according to claim 1, wherein the protection layer surrounds entirely the tube from one side of the tube to another side of the tube in a widthwise direction over an entire circumference of the tube.

17. The reinforced air bladder according to claim 1, wherein the tube is provided on the crown portion with a strengthening layer having non-woven fabric, short fiber or organic fiber cords aligned in the same direction.

18. The reinforced air bladder according to claim 1, wherein the outer circumference of the tube is provided with means for preventing a displacement to prevent the reinforcing hoop layer from moving in the width direction.

19. The reinforced air bladder according to claim 18, wherein the means for preventing a displacement are clipping projections which are arranged on two circumferential lines each passing through an outer circumferential point of the tube contacting each of the edges of the reinforcing hoop layer.

20. The reinforced air bladder according to claim 19, wherein each of the clipping projections has a ridge shape extending in the radial direction of the tube, or a hook shape with its tip portion bending and extending inwardly in the width direction of the reinforced air bladder.

21. The reinforced air bladder according to claim 18, wherein the means for preventing a displacement are at least two through projections which are arranged on two circumferential line each passing through outer circumferential points of the tube near the edges of the reinforcing hoop layer and which radially extend through the reinforcing hoop layer.

22. The reinforced air bladder according to claim 18, wherein the means for preventing a displacement are both of clipping projections which are arranged on two circumferential lines each passing through an outer circumferential point of the tube contacting each of the edges of the reinforcing hoop layer, and at least two through projections which are arranged on two circumferential line each passing through outer circumferential points of the tube near the edges of the reinforcing hoop layer and which radially extend through the reinforcing hoop layer.

23. The reinforced air bladder according to claim 18, wherein the means for preventing a displacement are side walls of a recessed portion shaped on the crown portion of the tube to be able to receive the reinforcing hoop layer.

* * * * *